US012581271B2

(12) United States Patent
Fu et al.

(10) Patent No.: US 12,581,271 B2
(45) Date of Patent: Mar. 17, 2026

(54) MOVEMENT TRACK GENERATION METHOD AND APPARATUS

(71) Applicant: Nokia Technologies OY, Espoo (FI)

(72) Inventors: Jinxin Fu, Xi'an (CN); Tianliang Xu, Xi'an (CN)

(73) Assignee: Nokia Technologies Oy, Espoo (FI)

( * ) Notice: Subject to any disclaimer, the term of this patent is extended or adjusted under 35 U.S.C. 154(b) by 392 days.

(21) Appl. No.: 18/042,737

(22) PCT Filed: Aug. 31, 2021

(86) PCT No.: PCT/CN2021/115769
§ 371 (c)(1),
(2) Date: Feb. 23, 2023

(87) PCT Pub. No.: WO2022/042751
PCT Pub. Date: Mar. 3, 2022

(65) Prior Publication Data
US 2023/0370814 A1     Nov. 16, 2023

(30) Foreign Application Priority Data

Aug. 31, 2020     (CN) ......................... 202010901548.9

(51) Int. Cl.
*H04W 4/029*     (2018.01)
*H04L 9/32*     (2006.01)
(Continued)

(52) U.S. Cl.
CPC .......... *H04W 4/029* (2018.02); *H04L 9/3231* (2013.01); *H04W 4/021* (2013.01); *H04W 4/33* (2018.02); *H04W 84/12* (2013.01)

(58) Field of Classification Search
CPC ....... H04W 4/029; H04W 4/33; H04W 4/021; H04W 84/12; H04L 9/3231; H04L 12/12; H04L 12/2803; H04L 12/2816
(Continued)

(56) References Cited

U.S. PATENT DOCUMENTS 9,210,625 B1 *  12/2015  Lovlekar ............... H04W 24/08
2003/0058808 A1 *  3/2003  Eaton ...................... H04L 67/52
370/313
(Continued)

FOREIGN PATENT DOCUMENTS

CN     106332224 A     1/2017
CN     107105411 A     8/2017
(Continued)

OTHER PUBLICATIONS

Extended European Search Report in European Appln. No. 21860583. 0, mailed on Mar. 20, 2024, 12 pages.

*Primary Examiner* — Jean A Gelin
(74) *Attorney, Agent, or Firm* — Harness, Dickey & Pierce, P.L.C.

(57) ABSTRACT

Example movement track generation methods and apparatus are described. In one example method, a server receives a first message sent by a first home device, and the first message indicates that the first device enters or leaves a wireless local area network (WLAN) coverage of the first home device. The server receives a second message sent by a second home device, and the second message indicates that the first device enters or leaves a WLAN coverage of the second home device. The server generates a movement track of the first device based on the first message and the second message, and the movement track of the first device includes location coordinates of the first home device and location coordinates of the second home device.

20 Claims, 25 Drawing Sheets

(51) Int. Cl.
    *H04W 4/021*       (2018.01)
    *H04W 4/33*        (2018.01)
    *H04W 84/12*       (2009.01)

(58) Field of Classification Search
    USPC ...................................................... 455/456.1
    See application file for complete search history.

(56)                References Cited

U.S. PATENT DOCUMENTS

| | | | | |
|---|---|---|---|---|
| 2004/0023669 A1* | 2/2004 | Reddy | ................. | H04W 36/322 |
| | | | | 455/433 |
| 2007/0243882 A1* | 10/2007 | Edge | .................... | H04W 48/16 |
| | | | | 455/456.1 |
| 2013/0034090 A1* | 2/2013 | Thomas | ................ | H04W 48/04 |
| | | | | 370/338 |
| 2015/0163811 A1* | 6/2015 | Konstantinou | ....... | H04W 76/16 |
| | | | | 370/329 |
| 2016/0050605 A1* | 2/2016 | Kim | ..................... | H04W 76/28 |
| | | | | 370/331 |
| 2017/0245211 A1* | 8/2017 | Patil | ..................... | H04W 8/005 |
| 2018/0227702 A1* | 8/2018 | Bitra | ..................... | H04W 4/023 |
| 2020/0221285 A1* | 7/2020 | Graul | ............... | H04W 36/0094 |

FOREIGN PATENT DOCUMENTS

| | | |
|---|---|---|
| CN | 110134356 A | 8/2019 |
| CN | 110909102 A | 3/2020 |
| WO | 2017162810 A1 | 9/2017 |

* cited by examiner

Electronic device 200

402

403

4G 📶 🔋 09:06

Drag and adjust a
location of a room

Bedroom | Bathroom

Living room

Room name: Living room
Room parameter:
Length:
Width:

404

⊕

(b)

401

4G 📶 🔋 09:06

Scan and import a floor plan    ∨

Edit the floor plan    ∨

⋮

(a)

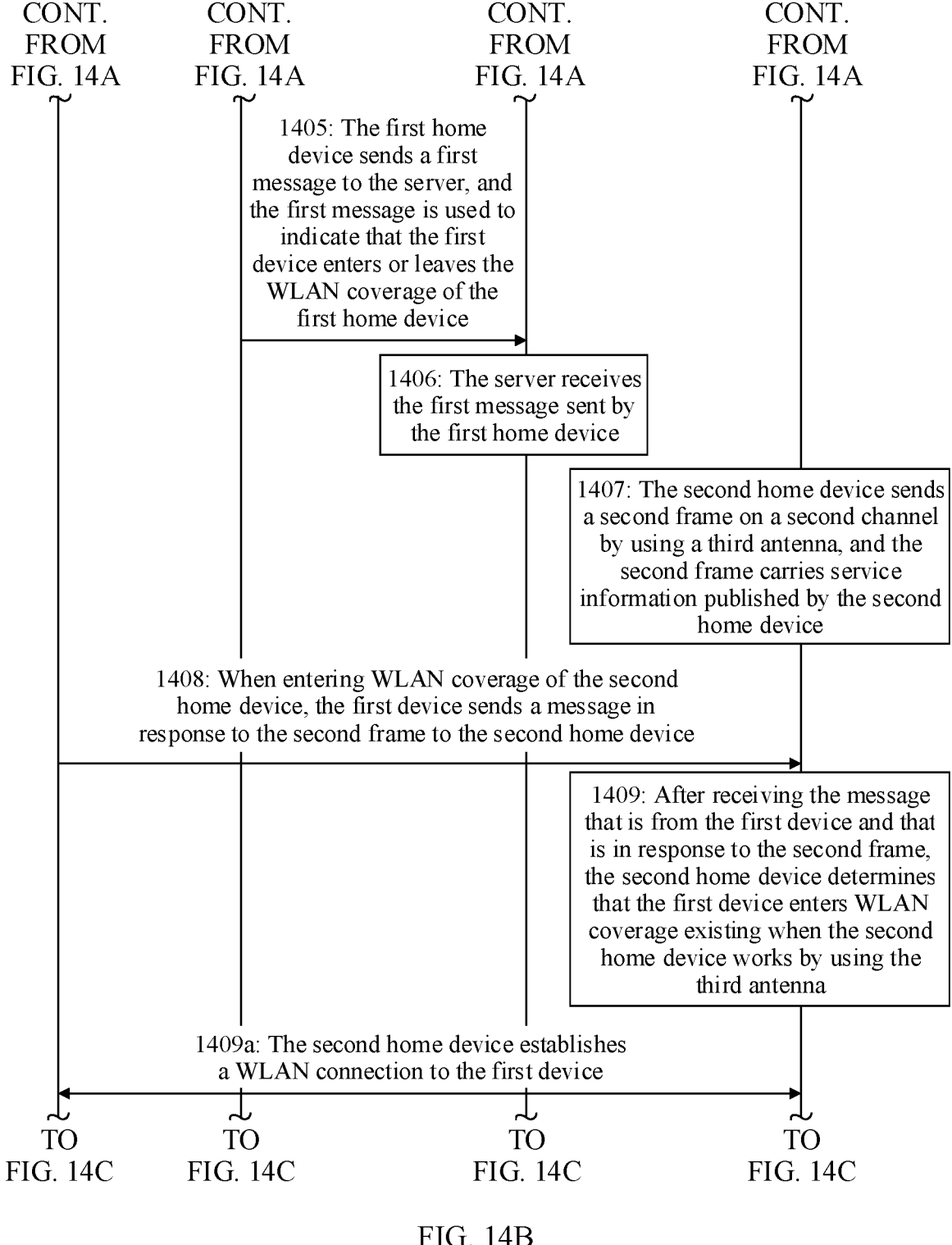

1405: The first home device sends a first message to the server, and the first message is used to indicate that the first device enters or leaves the WLAN coverage of the first home device 1406: The server receives the first message sent by the first home device 1407: The second home device sends a second frame on a second channel by using a third antenna, and the second frame carries service information published by the second home device 1408: When entering WLAN coverage of the second home device, the first device sends a message in response to the second frame to the second home device 1409: After receiving the message that is from the first device and that is in response to the second frame, the second home device determines that the first device enters WLAN coverage existing when the second home device works by using the third antenna 1409a: The second home device establishes a WLAN connection to the first device

FIG. 14B

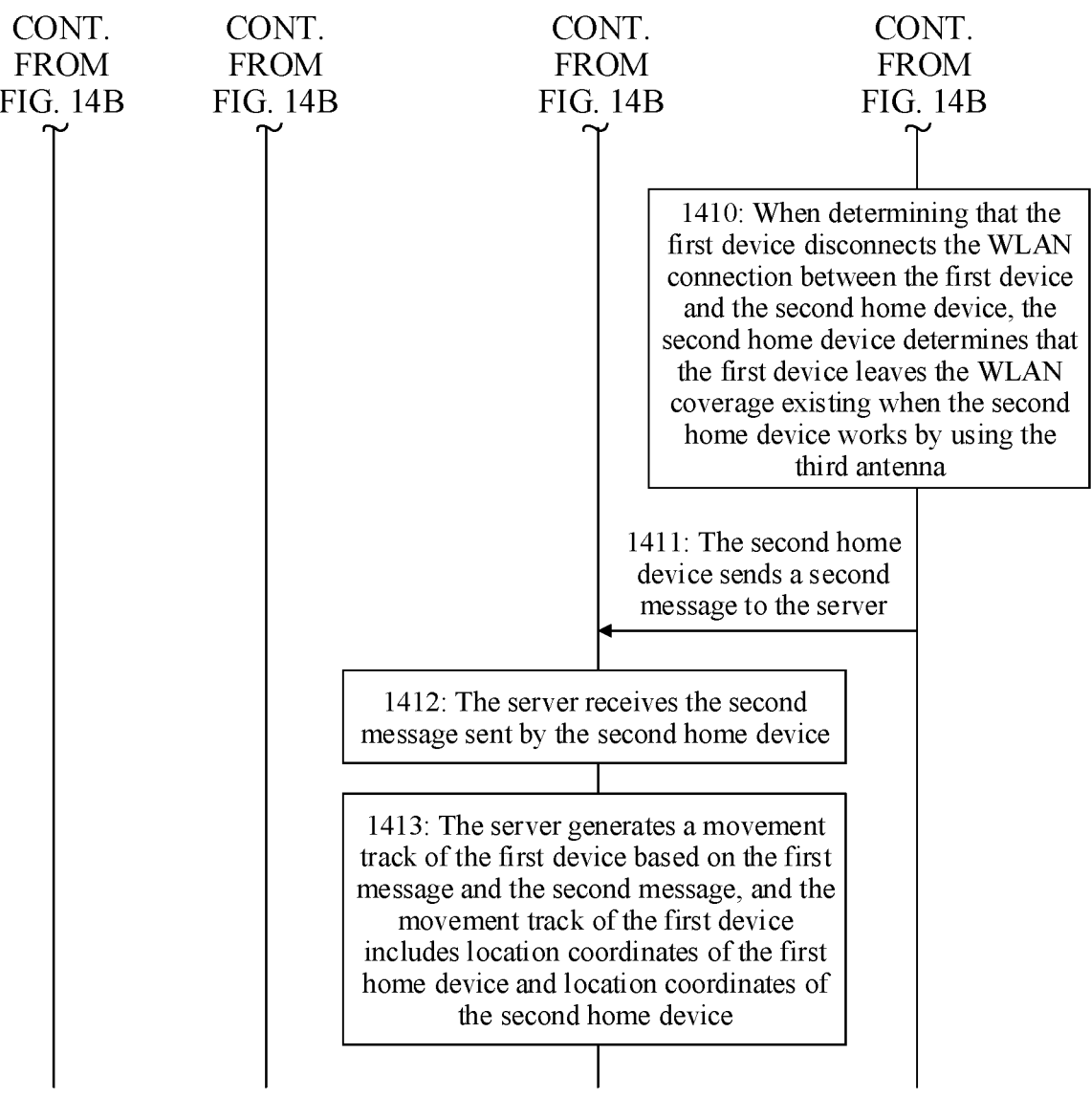

CONT. FROM FIG. 14B

CONT. FROM FIG. 14B

CONT. FROM FIG. 14B

CONT. FROM FIG. 14B

1410: When determining that the first device disconnects the WLAN connection between the first device and the second home device, the second home device determines that the first device leaves the WLAN coverage existing when the second home device works by using the third antenna 1411: The second home device sends a second message to the server 1412: The server receives the second message sent by the second home device 1413: The server generates a movement track of the first device based on the first message and the second message, and the movement track of the first device includes location coordinates of the first home device and location coordinates of the second home device

FIG. 14C

MOVEMENT TRACK GENERATION METHOD AND APPARATUS

CROSS REFERENCE TO RELATED APPLICATIONS

This application is a national stage of International Application No. PCT/CN2021/115769, filed on Aug. 31, 2021, which claims priority to Chinese Patent Application No. 202010901548.9, filed on Aug. 31, 2020. Both of the aforementioned applications are incorporated herein by reference in their entireties.

TECHNICAL FIELD

This application relates to the field of smart homes, and in particular, to a movement track generation method and apparatus.

BACKGROUND

The Internet of Things can connect various types of devices, and information can be exchanged between the devices, to implement intelligent management. The Internet of Things is widely applied. For example, the Internet of Things may be applied to various fields such as smart home, industrial production, disaster prevention monitoring, logistics tracking, smart grid, smart transportation, smart logistics, video surveillance, and smart healthcare.

Currently, in the field of smart homes, a home camera may be used to perform home care in a fixed region or at a fixed angle. When a movement track of a person or an animal (an elderly person or a pet) needs to be determined, targeted real-time viewing or recording playback needs to be performed on recording content recorded by the camera. This is time-consuming and labor-consuming.

SUMMARY

Embodiments of this application provide a movement track generation method and apparatus, so as to position a device in a home and generate a movement track.

According to a first aspect, an embodiment of this application provides a movement track generation method, including: A server receives a first message sent by a first home device, and the first message is used to indicate that a first device enters or leaves wireless local area network coverage (wireless local area networks, WLAN) of the first home device; the server receives a second message sent by a second home device, and the second message is used to indicate that the first device enters or leaves WLAN coverage of the second home device; and the server generates a movement track of the first device based on the first message and the second message, and the movement track of the first device includes location coordinates of the first home device and location coordinates of the second home device.

Based on the method provided in this embodiment of this application, the server may receive the first message and the second message. The server may determine, based on the first message and the second message, location information of the first device (for example, in the WLAN coverage of the first home device, or in the WLAN coverage of the second home device, or in an overlapping region of the WLAN coverage of the first home device and the WLAN coverage of the second home device), that is, may position on the first device (for example, a smart collar of a pet or a smart band of an elderly person). In addition, the server may generate the movement track of the first device based on the first message and the second message, and the movement track of the first device includes the location coordinates of the first home device and the location coordinates of the second home device. For example, the movement track of the first device may be moving from the WLAN coverage of the first home device to the WLAN coverage of the second home device, or moving from the WLAN coverage of the second home device to the WLAN coverage of the first home device.

In a possible implementation, the first device is located in the WLAN coverage of the first home device in a first time period; the first device is located in the WLAN coverage of the second home device in a second time period; and if the first time period and the second time period have an overlapping part, the first device is located in an overlapping region of the WLAN coverage of the first home device and the WLAN coverage of the second home device in the overlapping part, and the movement track of the first device includes location coordinates of a center of the overlapping region. It may be understood that the overlapping region of the WLAN coverage of the first home device and the WLAN coverage of the second home device is less than the WLAN coverage of the first home device or less than the WLAN coverage of the second home device. That is, a location of the first device can be more precisely positioned, and the movement track of the first device can also be more accurate.

In a possible implementation, the method further includes: The server determines the WLAN coverage of the first home device and the WLAN coverage of the second home device based on a floor plan, the location coordinates of the first home device, and the location coordinates of the second home device. The location coordinates of the first home device and the location coordinates of the second home device may indicate locations of the first home device and the second home device in the floor plan. If there is only the first home device and the second home device in a home, the WLAN coverage of the first home device and the WLAN coverage of the second home device are determined based on the floor plan, the location coordinates of the first home device, and the location coordinates of the second home device, so that the WLAN coverage of the first home device and the WLAN coverage of the second home device can implement full home coverage. Optionally, the server may further determine WLAN coverage of each home device based on locations of more home devices in the home in the floor plan, so that the WLAN coverage of the home device in the home implements full home coverage.

In a possible implementation, the first home device includes a first antenna and a second antenna, and WLAN coverage existing when the first home device works by using the first antenna is less than WLAN coverage existing when the first home device works by using the second antenna. When a range of a wireless transmit power of the first home device is required to be as small as possible, the first antenna may be used; and when the range of the wireless transmit power of the first home device is required to be large, the second antenna may be used.

In a possible implementation, the second home device includes a third antenna and a fourth antenna, and WLAN coverage existing when the second home device works by using the third antenna is less than WLAN coverage existing when the second home device works by using the fourth antenna. When a range of a wireless transmit power of the second home device is required to be as small as possible, the third antenna may be used; and when the range of the wireless transmit power of the second home device is required to be large, the fourth antenna may be used.

In a possible implementation, the WLAN coverage existing when the first home device works by using the first antenna is 0.1 m to 2 m. In this way, the range of the wireless transmit power of the first home device can implement small range precise coverage of 0.1 m to 2 m, so that a location of the first device can be positioned more accurately.

In a possible implementation, the WLAN coverage existing when the second home device works by using the third antenna is 0.1 m to 2 m. In this way, the range of the wireless transmit power of the second home device can implement small range precise coverage of 0.1 m to 2 m, so that a location of the first device can be positioned more accurately.

In a possible implementation, the method further includes: The server receives the floor plan, the location coordinates of the first home device, and the location coordinates of the second home device from a second device. In a case of whole-house customization, the second device may be a server of a home device manufacturer or a real estate manufacturer; and in a case of non-whole-house customization, the second device may be an electronic device.

In a possible implementation, the method further includes: The server allocates a first identifier to the first device, and the first identifier is associated with a first biometric identity. The first identifier is associated with the first biometric identity, or the first identifier is associated with a specific biometric recognition subject (a person or an animal). The person or the animal associated with the to-be-positioned device may be determined based on the first identifier, so that care for the specific biometric recognition subject can be implemented.

In a possible implementation, the method further includes: The server determines a heatmap based on location information of the first device and time information corresponding to the location information. The location information of the first device includes the WLAN coverage of the first home device and the WLAN coverage of the second home device; and the time information corresponding to the location information includes duration in which the first device is located in the WLAN coverage of the first home device and duration in which the first device is located in the WLAN coverage of the second home device. In this way, the heatmap may determine an indoor movement status and stay duration of the to-be-positioned device, so that more careful care can be implemented for a biometric recognition subject corresponding to the first device.

In a possible implementation, the method further includes: The server sends a third message to an electronic device. A first application is installed on the electronic device, the server is the server corresponding to the first application, and the third message includes at least one of the location information, the movement track, and the heatmap of the first device. In this way, the user may remotely obtain the at least one of the location information, the movement track, and the heatmap of the first device (for example, the smart collar of the pet or the smart band of the elderly person) by using the electronic device (for example, a mobile phone), to improve user experience.

In a possible implementation, the method further includes: The server performs scenario linkage control or alarm based on the at least one of the location information, the movement track, and the heatmap of the first device. Through scenario linkage control or alarm, more intelligent care can be implemented for the biometric recognition subject corresponding to the first device.

In a possible implementation, the performing, by the server, scenario linkage control based on the at least one of the location information, the movement track, and the heatmap of the first device includes: the server determines whether a scenario linkage trigger condition is satisfied, and if the scenario linkage trigger condition is satisfied, controls a target device to perform a target event. The scenario linkage trigger condition includes N attributes, and the N attributes include at least one of a biometric attribute, a range attribute, and a time attribute associated with the range attribute, where N is an integer greater than or equal to 1. Through scenario linkage control or alarm, more intelligent care can be implemented for the biometric recognition subject corresponding to the first device. For example, if it is detected that a collar (representing a pet dog) worn by a pet dog enters a range (within 30 cm) of a feeding machine within a time period from 8 a.m. to 10 a.m. and remains for more than 30 s, the feeding machine is controlled to feed.

According to a second aspect, an embodiment of this application provides a movement track generation method, including: A home device sends a target frame on a target channel by using a first antenna, and the target frame carries service information published by the home device. The home device includes the first antenna and a second antenna, and wireless local area network WLAN coverage existing when the home device works by using the first antenna is less than WLAN coverage existing when the home device works by using the second antenna; after receiving a message that is from a first device and that is in response to the target frame, the home device determines that the first device enters the WLAN coverage existing when the home device works by using the first antenna; and the home device records an entry event of the first device, and sends a first message to a server, and the first message is used to indicate that the first device enters WLAN coverage of a first home device.

Based on the method provided in this embodiment of this application, when a range of a wireless transmit power of the home device is required to be as small as possible, the first antenna may be used; and when the range of the wireless transmit power of the home device is required to be large, the second antenna may be used. When the home device uses the first antenna, the range of the wireless transmit power can implement precise coverage in a small range. When the first device enters the WLAN coverage existing when the home device works by using the first antenna, the home device may send the first message to the server, so that the server can more accurately determine a location of the first device based on the first message.

In a possible implementation, the method further includes: When determining that the first device disconnects a WLAN connection between the first device and the home device, the home device determines that the first device leaves the WLAN coverage existing when the home device works by using the first antenna; and the home device records a leaving event of the first device, and sends a second message to the server, and the second message is used to indicate that the first device leaves WLAN coverage existing when the first home device works by using the first antenna.

When the home device uses the first antenna, the range of the wireless transmit power can implement precise coverage in a small range. When the first device leaves the WLAN coverage existing when the home device works by using the first antenna, the home device may send the second message to the server, so that the server can more accurately determine a location of the first device based on the second message.

In a possible implementation, the WLAN coverage existing when the home device works by using the first antenna is 0.1 m to 2 m. In this way, the range of the wireless transmit power of the home device can implement small range precise coverage of 0.1 m to 2 m, so that a location of the first device can be positioned more accurately.

According to a third aspect, an embodiment of this application provides a movement track generation method, applied to a system including a server, a first home device, a second home device, and a first device, and the method includes: The first home device sends a first message to the server, and the first message is used to indicate that the first device enters or leaves wireless local area network WLAN coverage of the first home device; the server receives the first message sent by the first home device; the second home device sends a second message to the server, and the second message is used to indicate that the first device enters or leaves WLAN coverage of the second home device; the server receives the second message sent by the second home device; and the server generates a movement track of the first device based on the first message and the second message, and the movement track of the first device includes location coordinates of the first home device and location coordinates of the second home device.

Based on the method provided in this embodiment of this application, the server may determine, based on the first message and the second message, location information of the first device (for example, in the WLAN coverage of the first home device, or in the WLAN coverage of the second home device, or in an overlapping region of the WLAN coverage of the first home device and the WLAN coverage of the second home device), that is, may position on the first device (for example, a smart collar of a pet or a smart band of an elderly person). In addition, the server may generate the movement track of the first device based on the first message and the second message, and the movement track of the first device includes the location coordinates of the first home device and the location coordinates of the second home device. For example, the movement track of the first device may be moving from the WLAN coverage of the first home device to the WLAN coverage of the second home device, or moving from the WLAN coverage of the second home device to the WLAN coverage of the first home device.

In a possible implementation, the first home device includes a first antenna and a second antenna, and WLAN coverage existing when the first home device works by using the first antenna is less than WLAN coverage existing when the first home device works by using the second antenna.

In a possible implementation, the second home device includes a third antenna and a fourth antenna, and WLAN coverage existing when the second home device works by using the third antenna is less than WLAN coverage existing when the second home device works by using the fourth antenna.

In a possible implementation, the WLAN coverage existing when the first home device works by using the first antenna is 0.1 m to 2 m.

In a possible implementation, the WLAN coverage existing when the second home device works by using the third antenna is 0.1 m to 2 m.

In a possible implementation, before the sending, by the first home device, a first message to the server, the method further includes: The first home device sends a first frame on a first channel by using the first antenna, and the first frame carries service information published by the first home device; when entering the WLAN coverage existing when the first home device works by using the first antenna, the first device sends a message in response to the first frame to the first home device; after receiving the message that is from the first device and that is in response to the first frame, the first home device determines that the first device enters the WLAN coverage existing when the first home device works by using the first antenna; and the first home device establishes a WLAN connection to the first device.

In a possible implementation, the method further includes: When determining that the first device disconnects the WLAN connection between the first device and the first home device, the first home device determines that the first device leaves the WLAN coverage existing when the first home device works by using the first antenna.

In a possible implementation, before the sending, by the second home device, a second message to the server, the method further includes: The second home device sends a second frame on a second channel by using the third antenna, and the second frame carries service information published by the second home device; when entering the WLAN coverage existing when the second home device works by using the third antenna, the first device sends a message in response to the second frame to the second home device; after receiving the message that is from the first device and that is in response to the second frame, the second home device determines that the first device enters the WLAN coverage existing when the second home device works by using the third antenna; and the second home device establishes a WLAN connection to the first device.

In a possible implementation, the method further includes: When determining that the first device disconnects the WLAN connection between the first device and the second home device, the second home device determines that the first device leaves the WLAN coverage existing when the second home device works by using the third antenna.

In a possible implementation, the first device is located in the WLAN coverage of the first home device in a first time period; the first device is located in the WLAN coverage of the second home device in a second time period; and if the first time period and the second time period have an overlapping part, the first device is located in an overlapping region of the WLAN coverage of the first home device and the WLAN coverage of the second home device in the overlapping part, and the movement track of the first device includes location coordinates of a center of the overlapping region.

In a possible implementation, the method further includes: The server determines the WLAN coverage of the first home device and the WLAN coverage of the second home device based on a floor plan, the location coordinates of the first home device, and the location coordinates of the second home device.

In a possible implementation, the method further includes: The server receives the floor plan, the location coordinates of the first home device, and the location coordinates of the second home device from a second device.

In a possible implementation, the method further includes: The server allocates a first identifier to the first device, and the first identifier is associated with a first biometric identity.

In a possible implementation, the method further includes: The server determines a heatmap based on location information of the first device and time information corresponding to the location information. The location information of the first device includes the WLAN coverage of the first home device and the WLAN coverage of the second home device; and the time information corresponding to the location information includes duration in which the first device is located in the WLAN coverage of the first home device and duration in which the first device is located in the WLAN coverage of the second home device.

In a possible implementation, the method further includes: The server sends a third message to an electronic device. A first application is installed on the electronic device, the server is the server corresponding to the first application, and the third message includes at least one of the location information, the movement track, and the heatmap of the first device.

In a possible implementation, the method further includes: The server performs scenario linkage control or alarm based on the at least one of the location information, the movement track, and the heatmap of the first device.

In a possible implementation, the performing, by the server, scenario linkage control based on the at least one of the location information, the movement track, and the heatmap of the first device includes: the server determines whether a scenario linkage trigger condition is satisfied, and if the scenario linkage trigger condition is satisfied, controls a target device to perform a target event. The scenario linkage trigger condition includes N attributes, and the N attributes include at least one of a biometric attribute, a range attribute, and a time attribute associated with the range attribute, where N is an integer greater than or equal to 1.

According to a fourth aspect, an embodiment of this application provides a server. The server includes: a wireless communications module, a memory, and one or more processors, and the wireless communications module and the memory are coupled to the processor; and the memory is configured to store computer program code, and the computer program code includes computer instructions; and when the computer instructions are executed by the processor, the server is enabled to perform the method in any one of the first aspect and the possible implementations of the first aspect.

According to a fifth aspect, an embodiment of this application provides a movement track generation apparatus. The apparatus has a function to implement the method in any one of the first aspect and the possible implementations of the first aspect. The function may be implemented by hardware, or may be implemented by hardware executing corresponding software. The hardware or the software includes one or more modules corresponding to the foregoing function.

According to a sixth aspect, an embodiment of this application provides a home device. The home device includes: a wireless communications module, a memory, and one or more processors, and the wireless communications module and the memory are coupled to the processor; and the memory is configured to store computer program code, and the computer program code includes computer instructions; and when the computer instructions are executed by the processor, the home device is enabled to perform the method in any one of the second aspect and the possible implementations of the second aspect.

According to a seventh aspect, an embodiment of this application provides a movement track generation apparatus. The apparatus has a function to implement the method in any one of the second aspect and the possible implementations of the second aspect. The function may be implemented by hardware, or may be implemented by hardware executing corresponding software. The hardware or the software includes one or more modules corresponding to the foregoing function.

According to an eighth aspect, an embodiment of this application provides a chip system, and the chip system includes one or more interface circuits and one or more processors. The interface circuit and the processor are connected to each other through a line.

The chip system may be used in a server including a communications module and a memory. The interface circuit is configured to receive a signal from the memory in the electronic device, and send the received signal to the processor, and the signal includes computer instructions stored in the memory. When the processor executes the computer instructions, the server may perform the method in any one of the first aspect and the possible implementations of the first aspect.

Alternatively, the chip system may be used in a home device including a communications module and a memory. The interface circuit is configured to receive a signal from the memory in the home device, and send the received signal to the processor, and the signal includes computer instructions stored in the memory. When the processor executes the computer instructions, the home device may perform the method in any one of the second aspect and the possible implementations of the second aspect.

According to a ninth aspect, an embodiment of this application provides a computer-readable storage medium. The computer-readable storage medium includes computer instructions. When the computer instructions are run on a server, the server is enabled to perform the method in any one of the first aspect and the possible implementations of the first aspect. When the computer instructions are run on a home device, the home device is enabled to perform the method in any one of the second aspect and the possible implementations of the second aspect.

According to a tenth aspect, an embodiment of this application provides a computer program product. When the computer program product is run on a computer, the computer is enabled to perform the method in any one of the first aspect or the second aspect and the possible implementations of the second aspect.

According to an eleventh aspect, an embodiment of this application provides a movement track generation system, including a server and a home device (including a first home device and a second home device). The server may perform the method in any one of the first aspect and the possible implementations of the first aspect, and the home device may perform the method in any one of the second aspect and the possible implementations of the second aspect.

Optionally, the movement track generation system may further include a first device and an electronic device, and the first device and the electronic device may perform the method related to the first device and the electronic device in any one of the third aspect and the possible implementations of the third aspect.

US 12,581,271 B2

9

Figure 4:
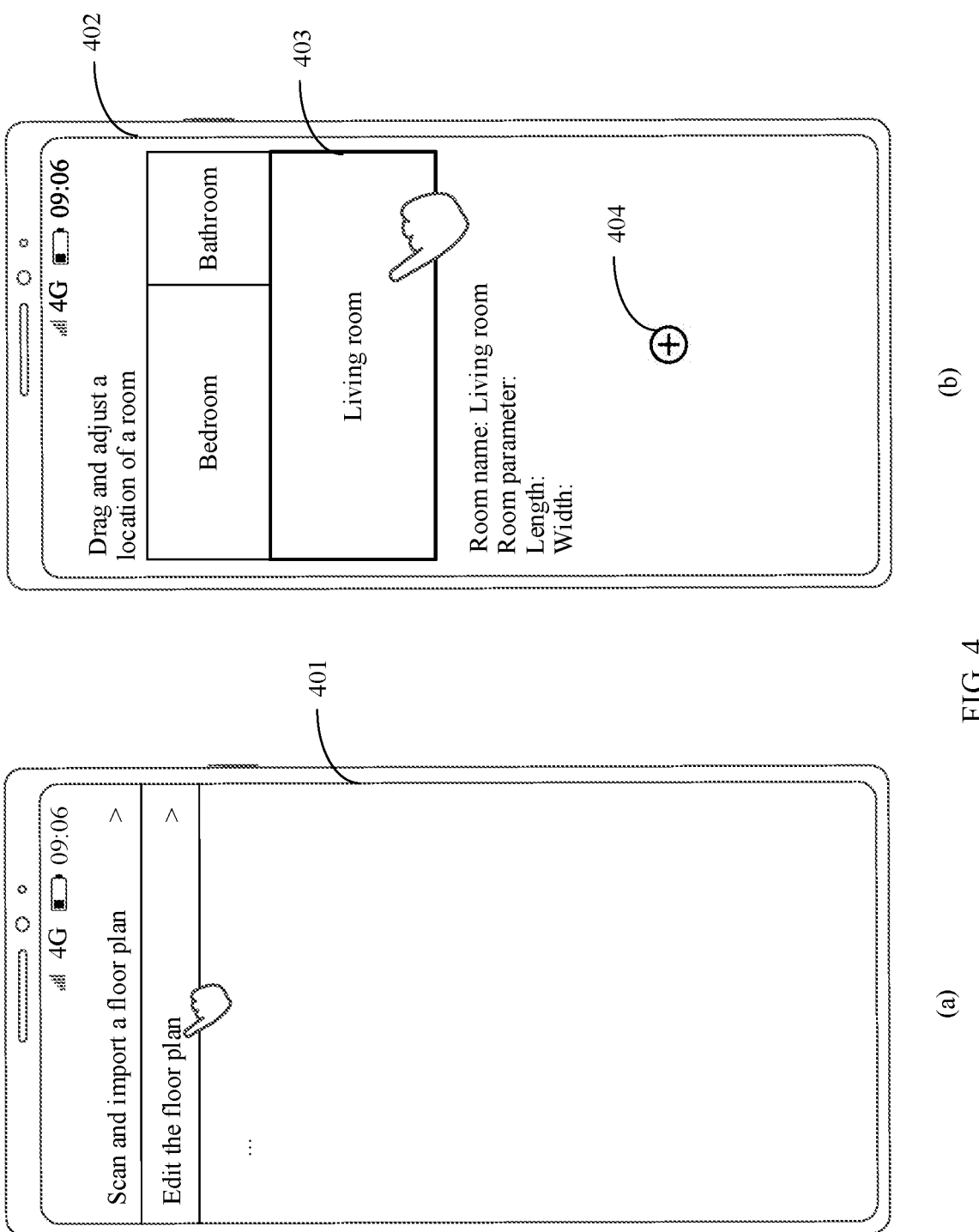
Figure 5A:
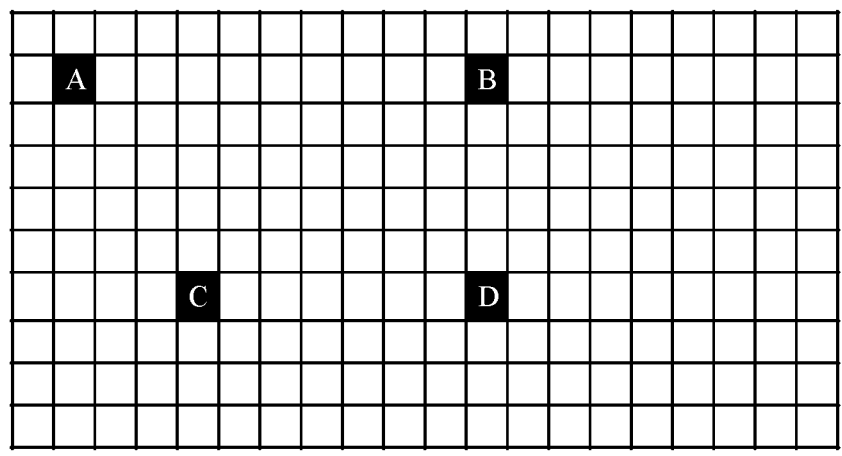
Figure 5A:
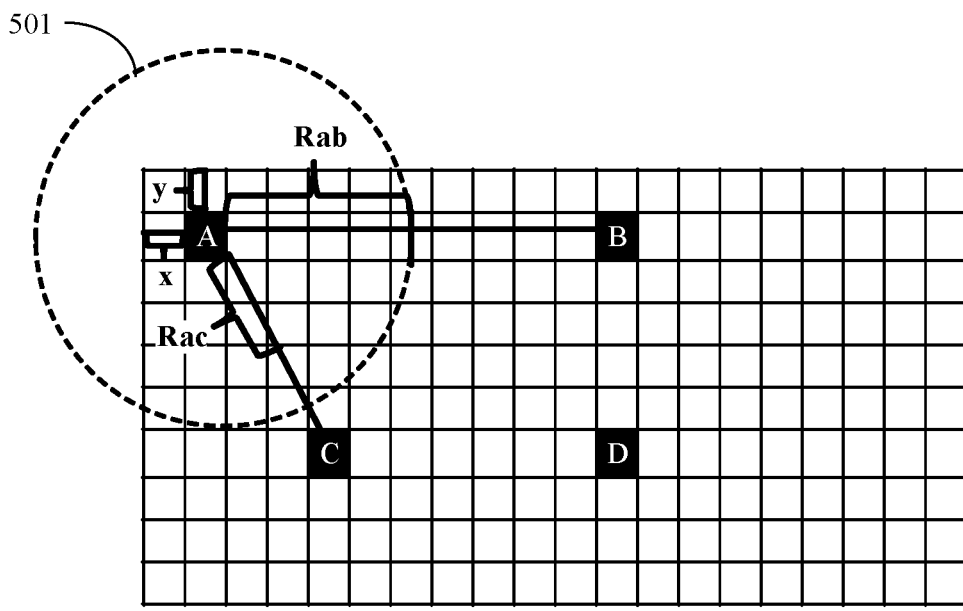
Figure 5A:
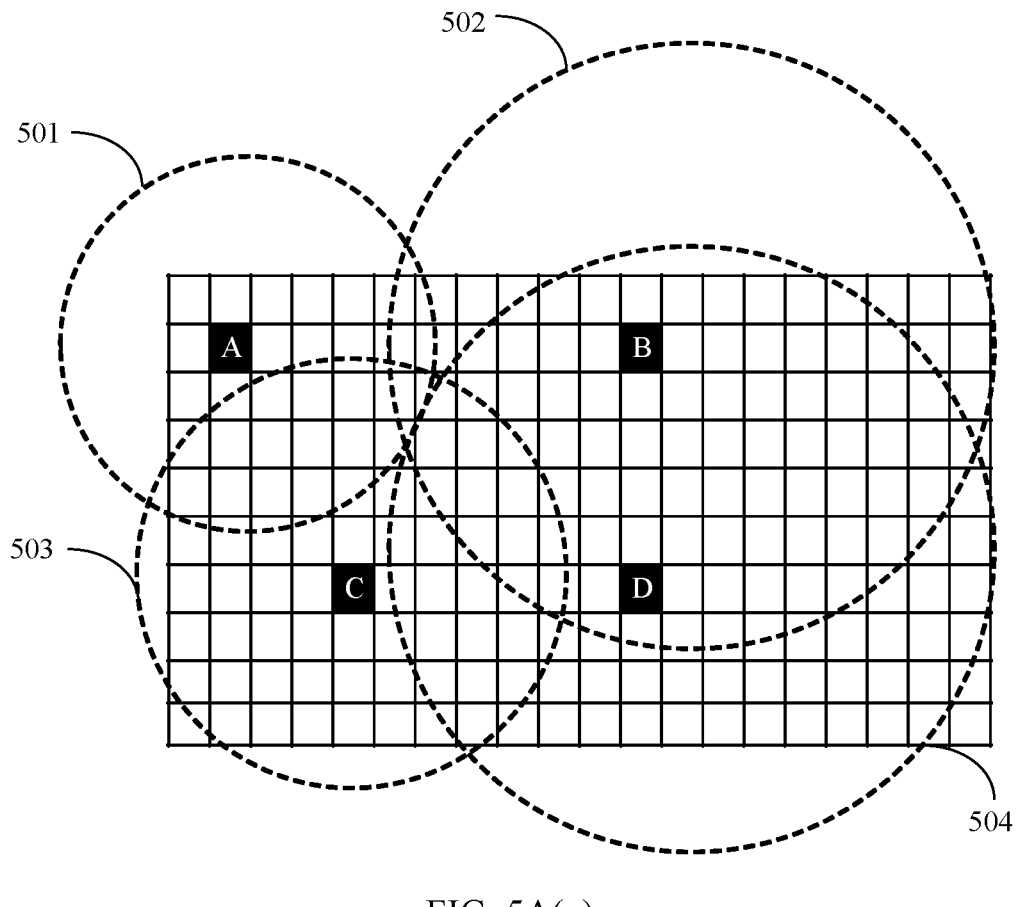
Figure 5B:
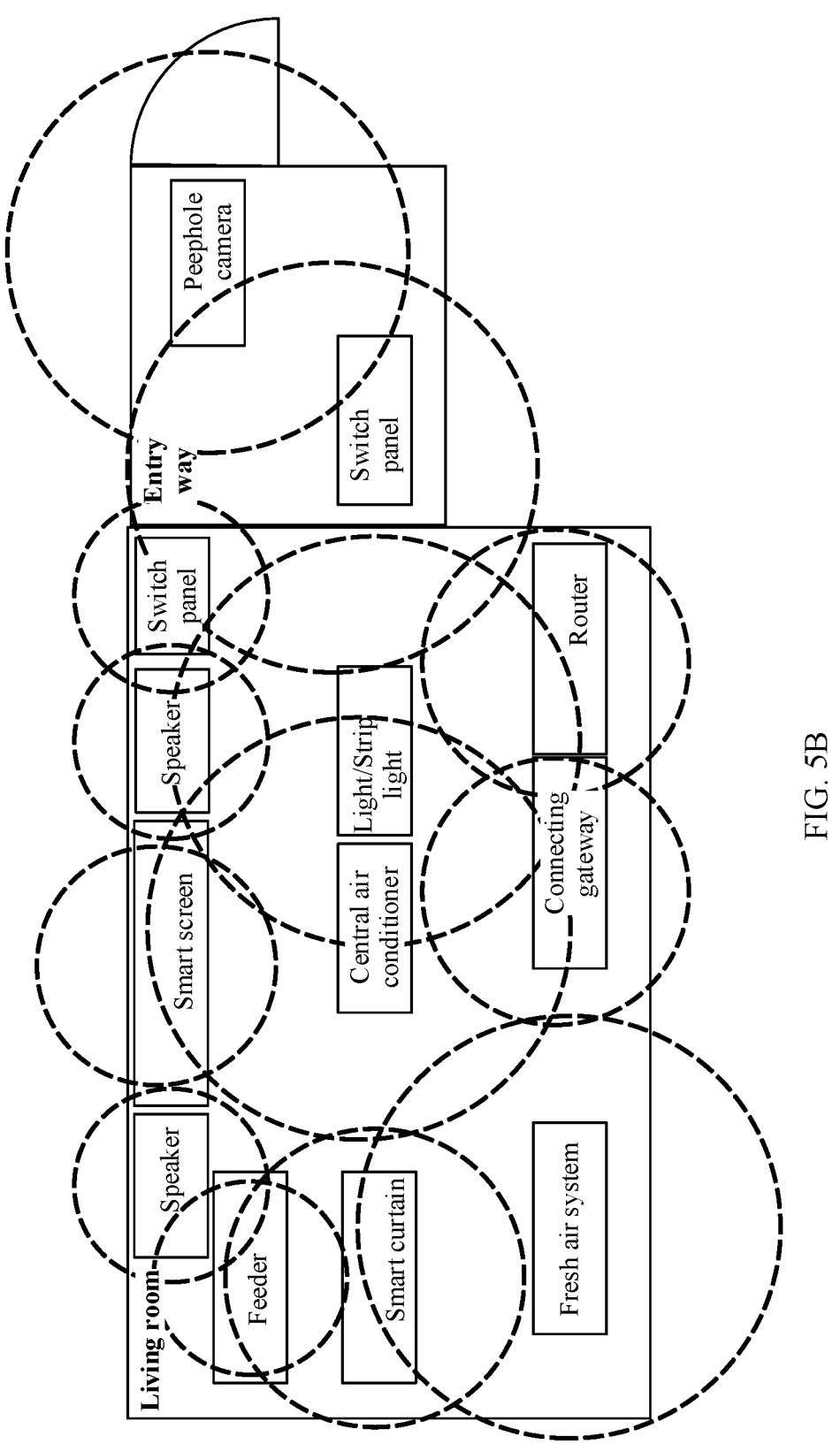
Figure 5C:
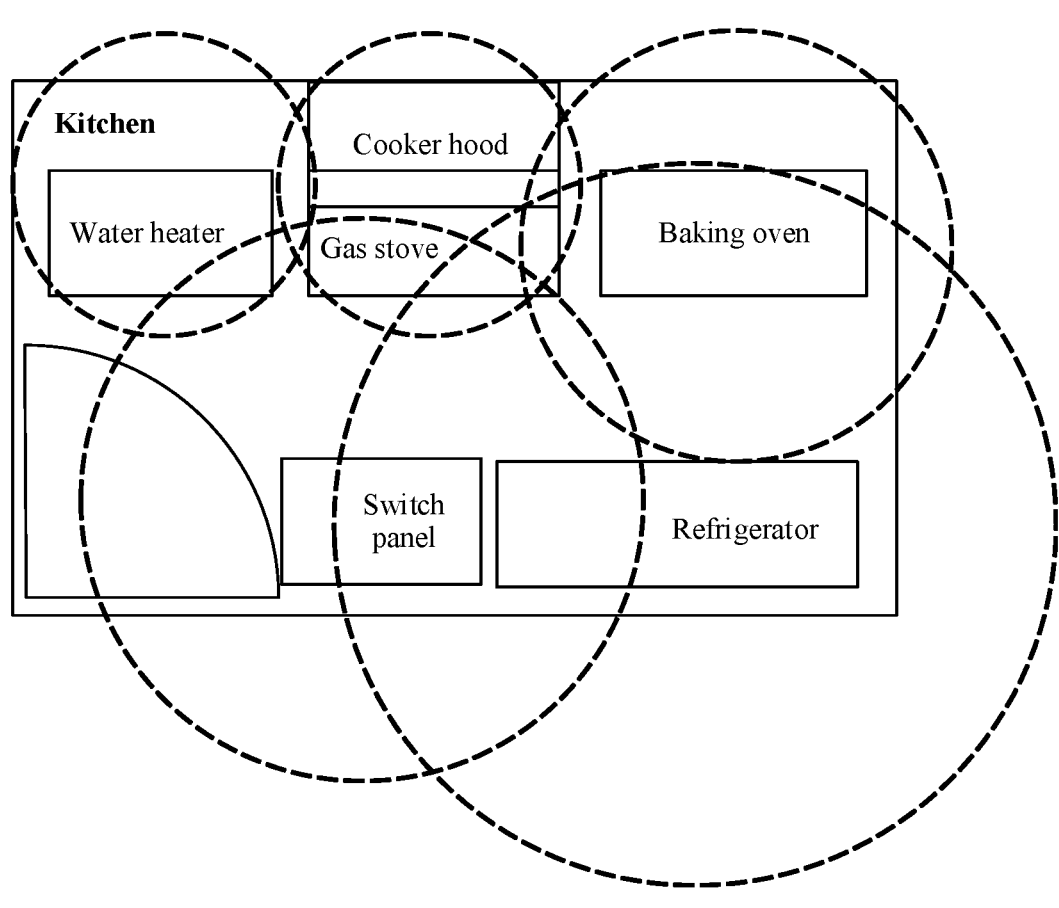
Figure 6A:
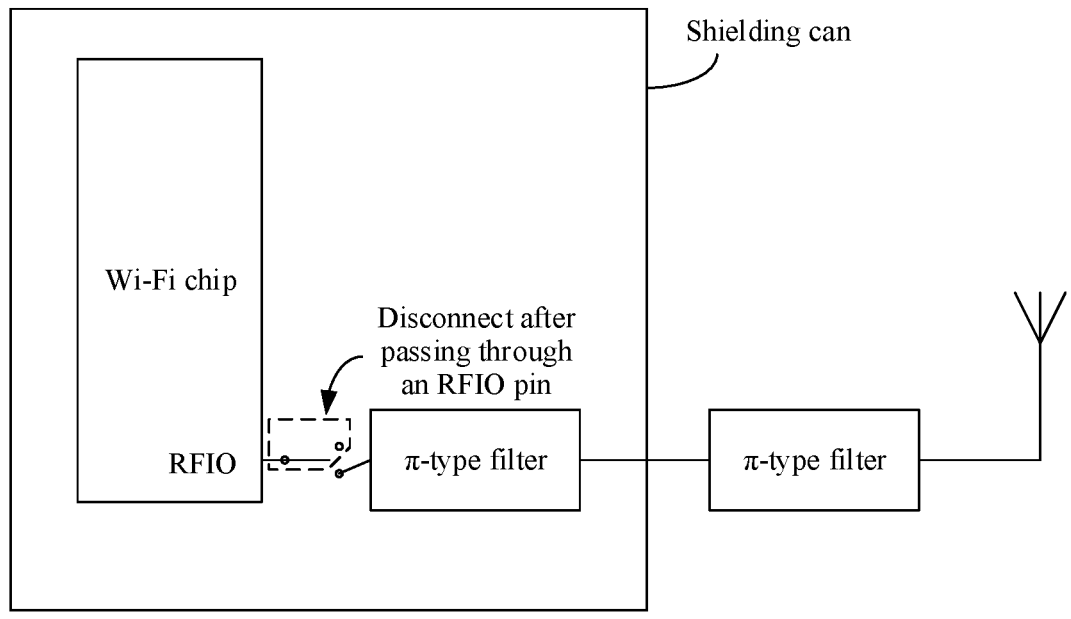
Figure 6B:
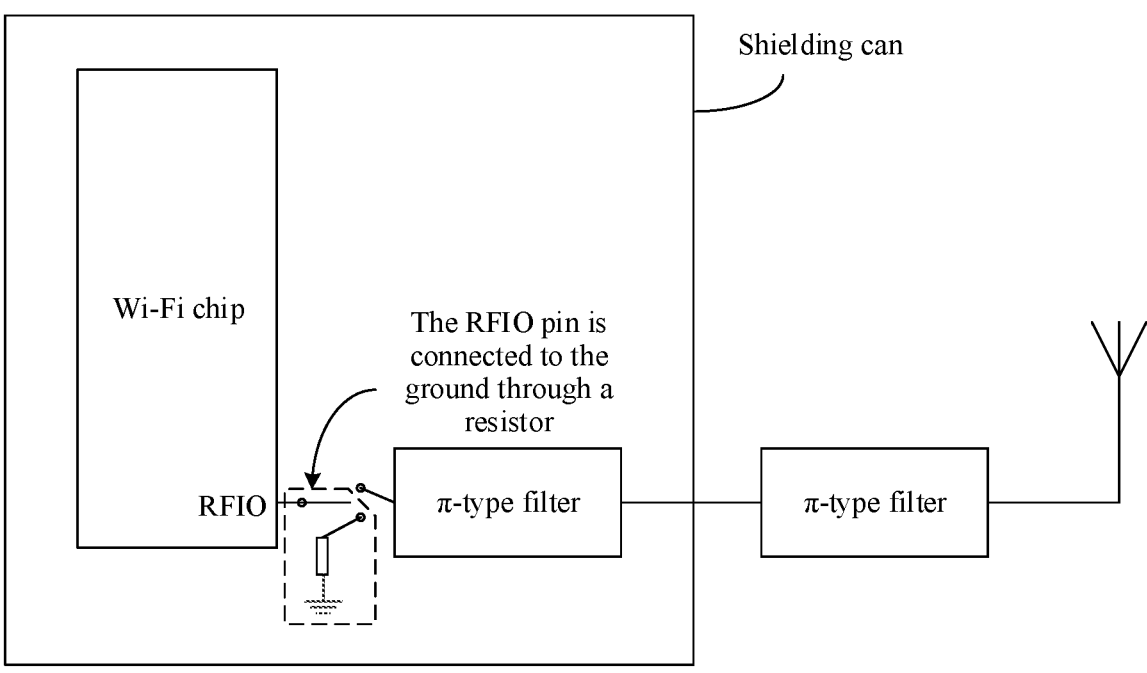
Figure 6C:
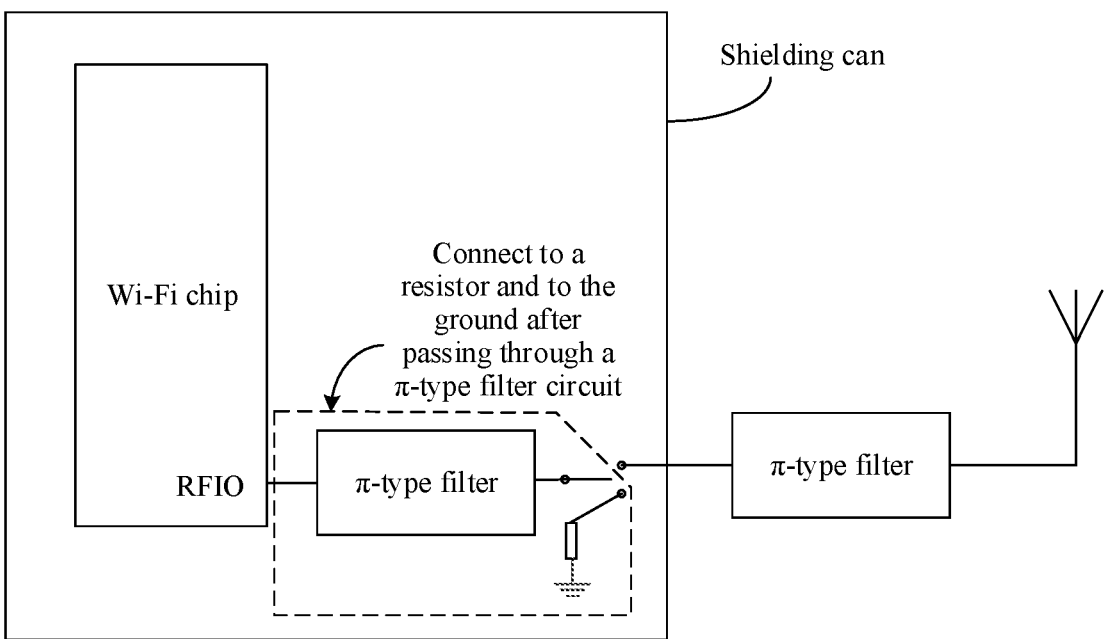
Figure 7A:
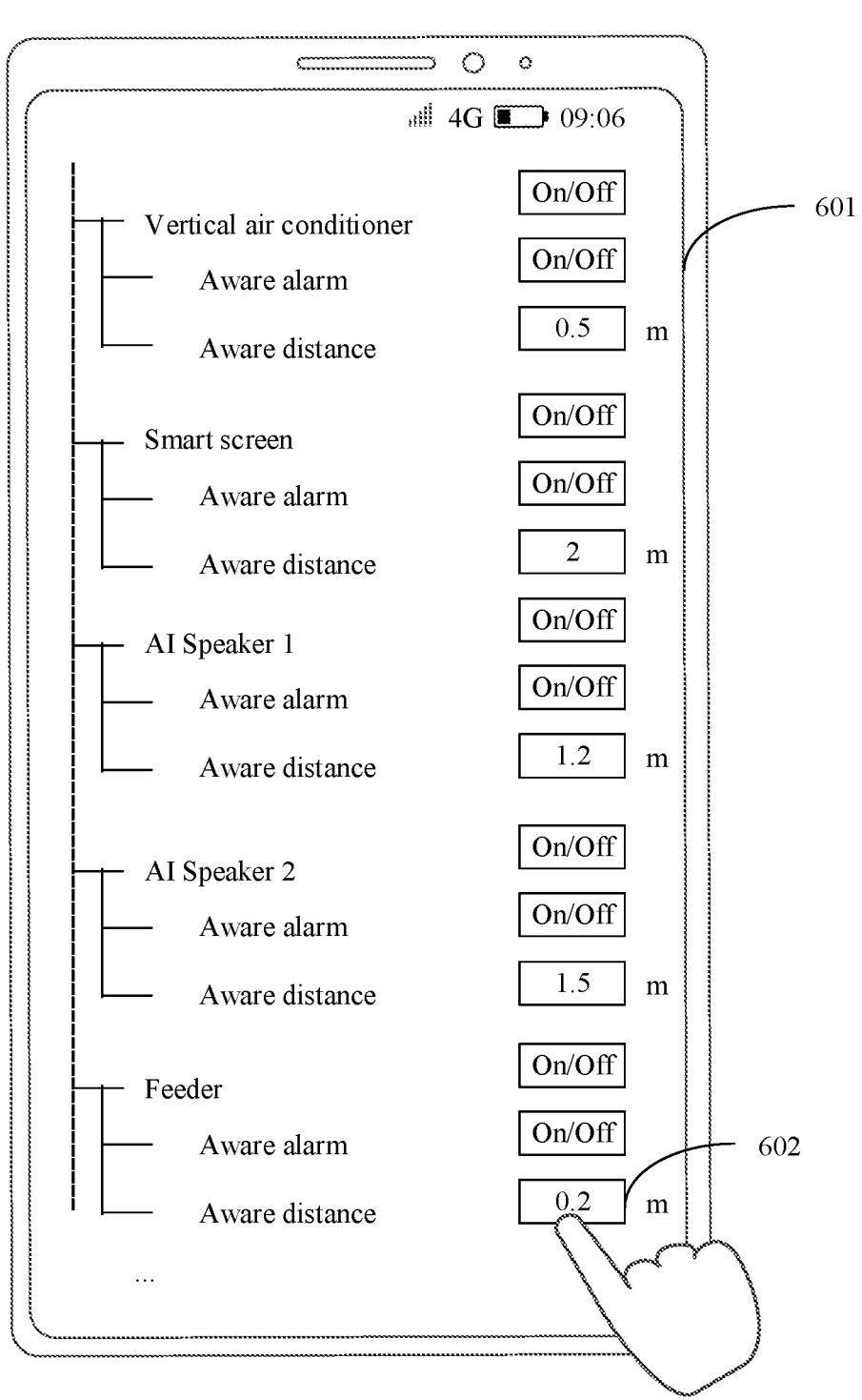
Figure 7B:
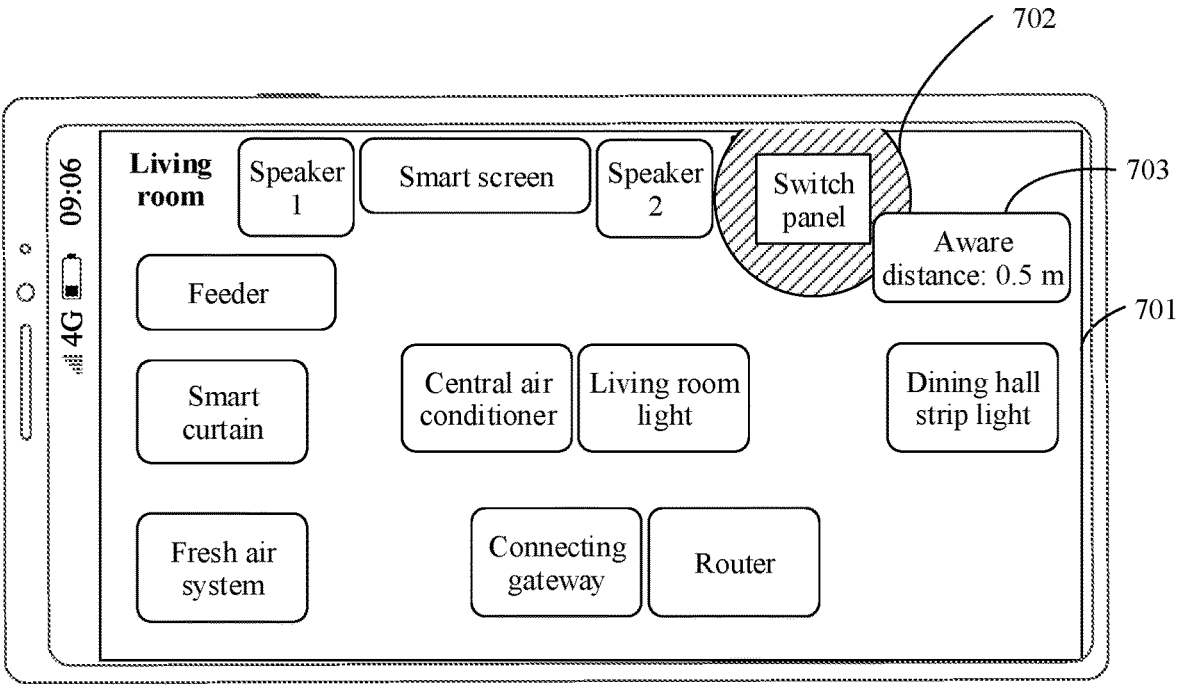
Figure 8:
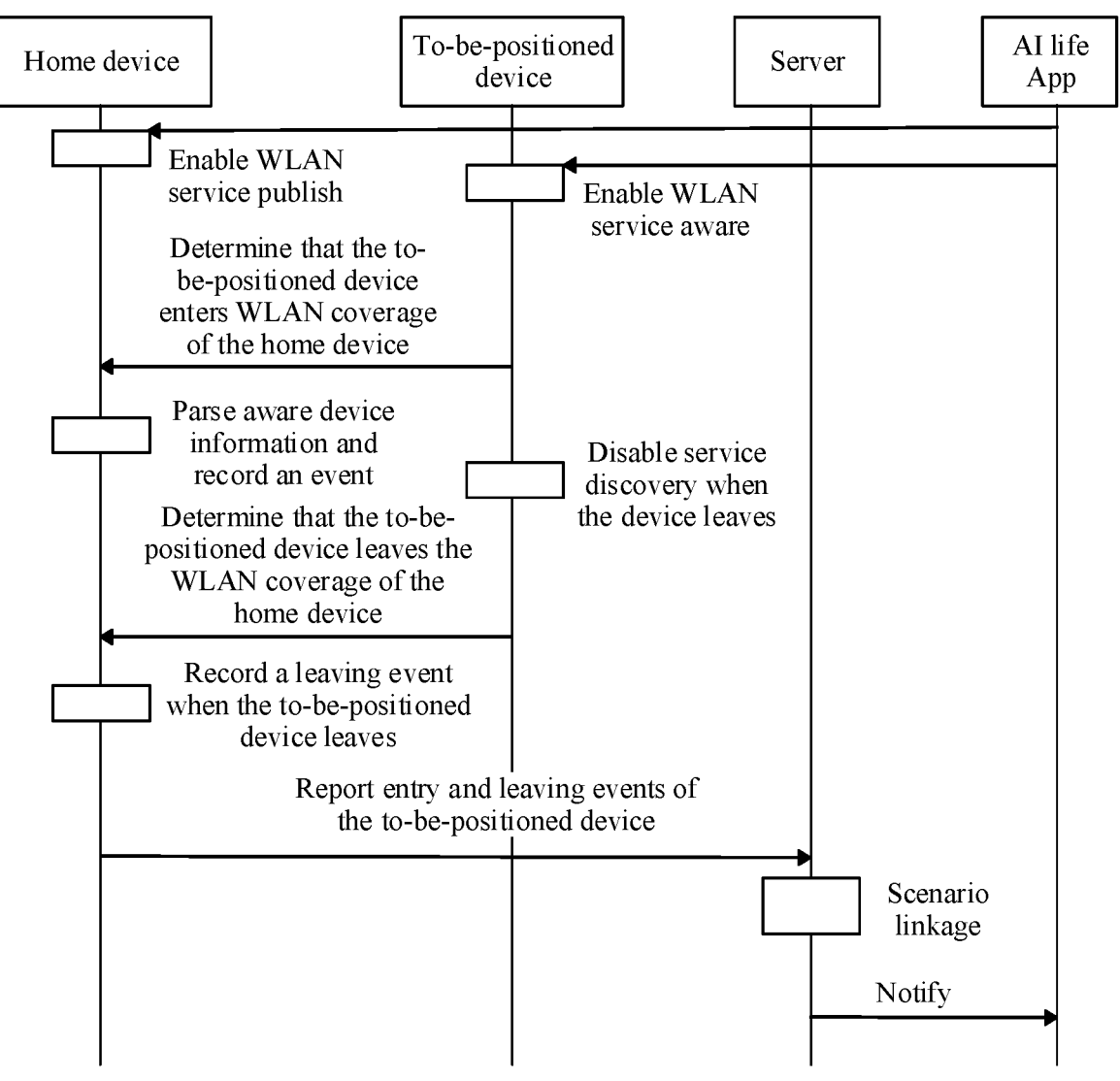
Figure 9:
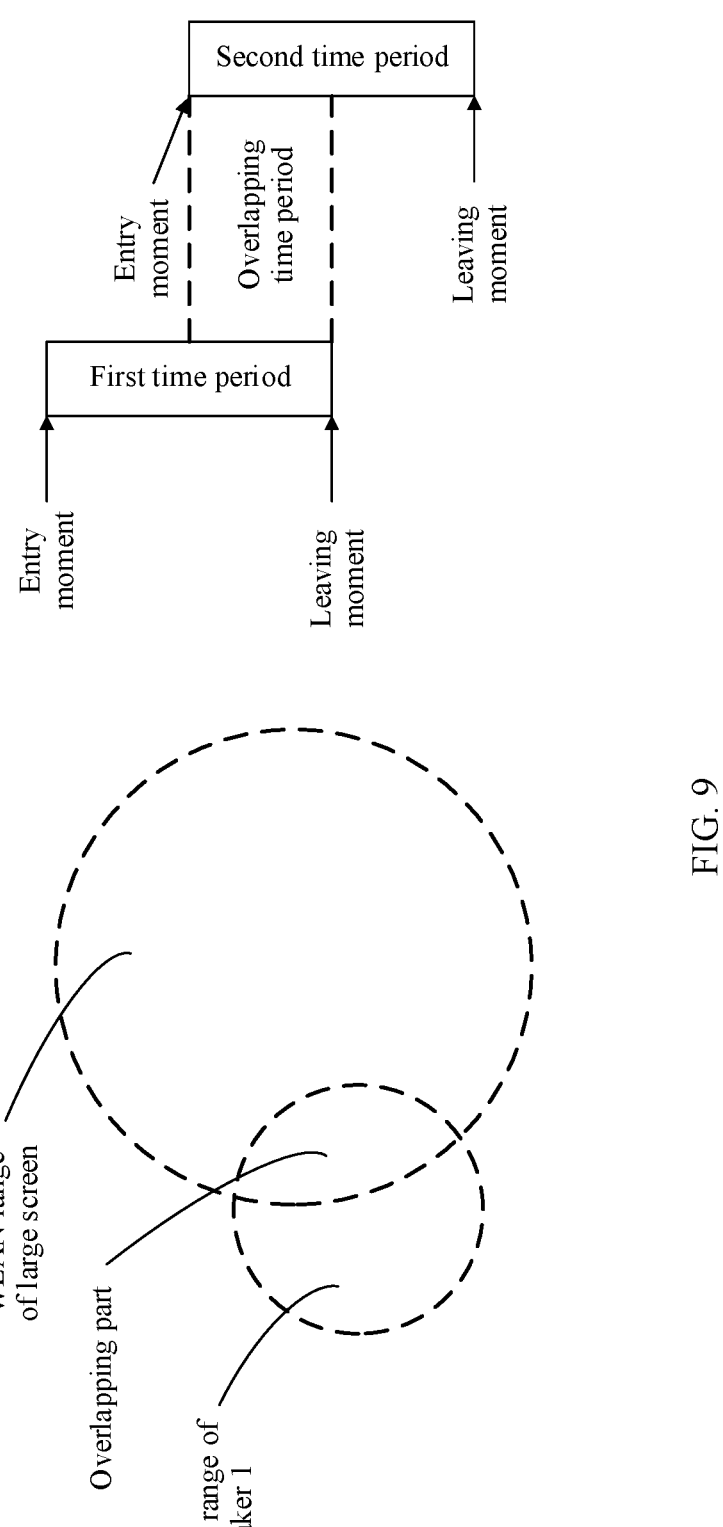
Figure 10:
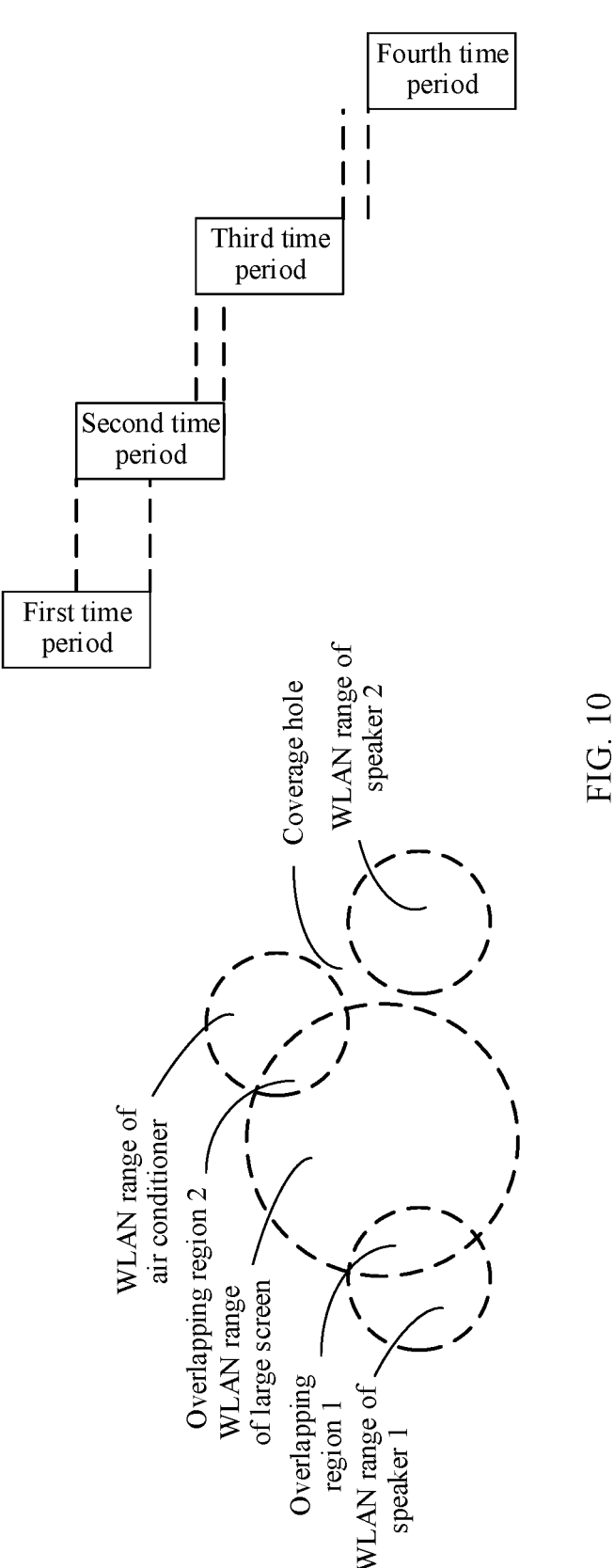
Figure 11:
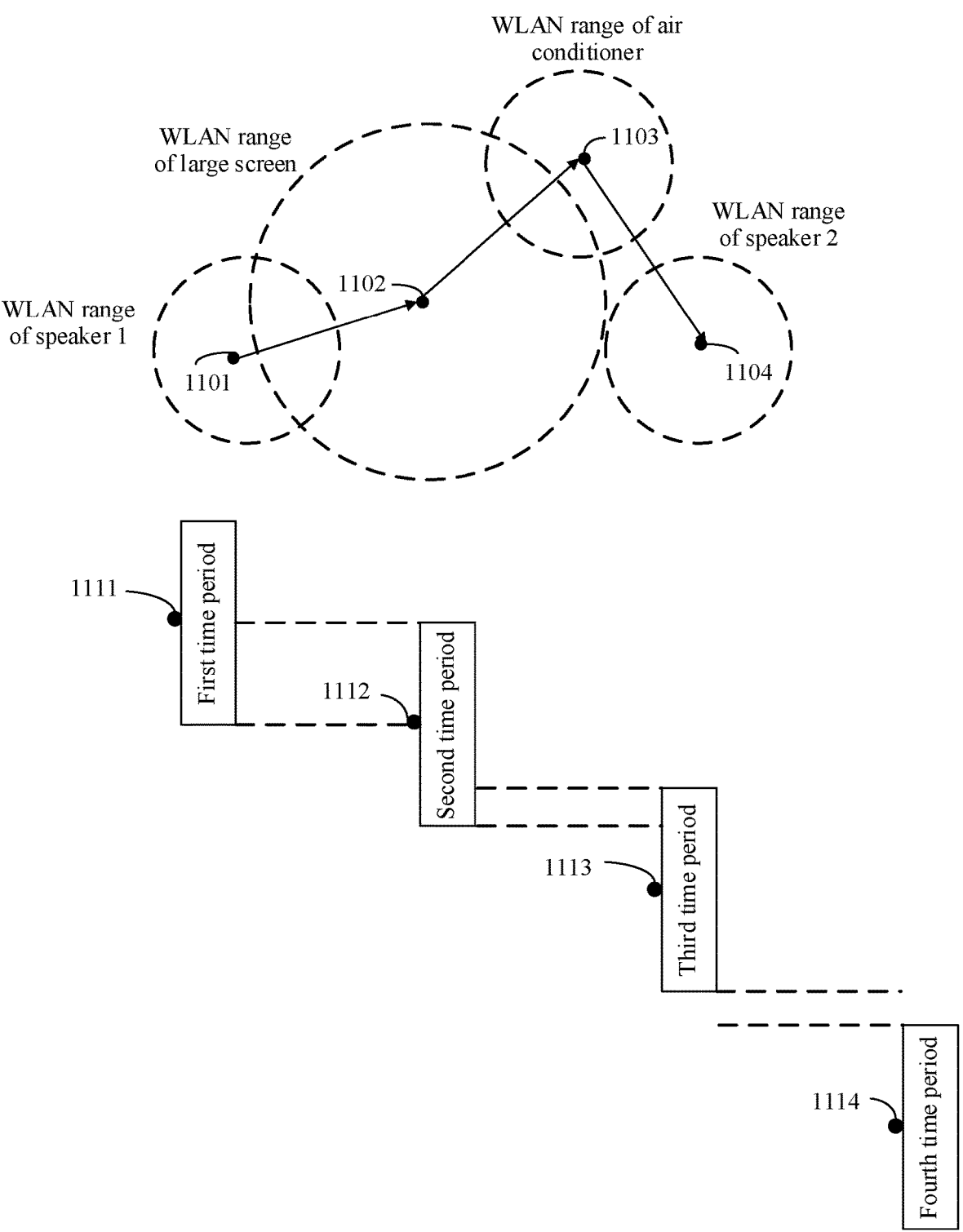
Figure 12:
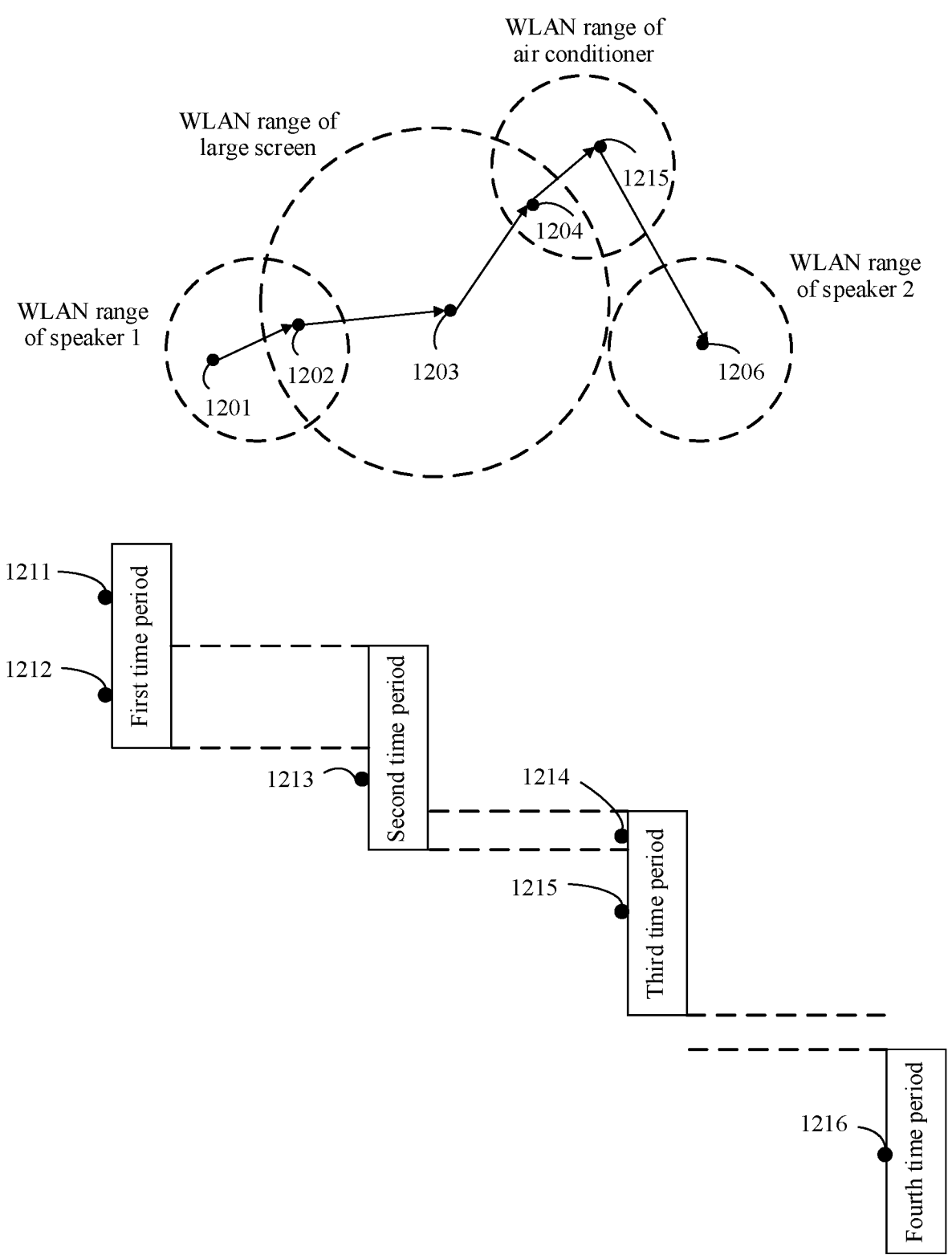
Figure 13A:
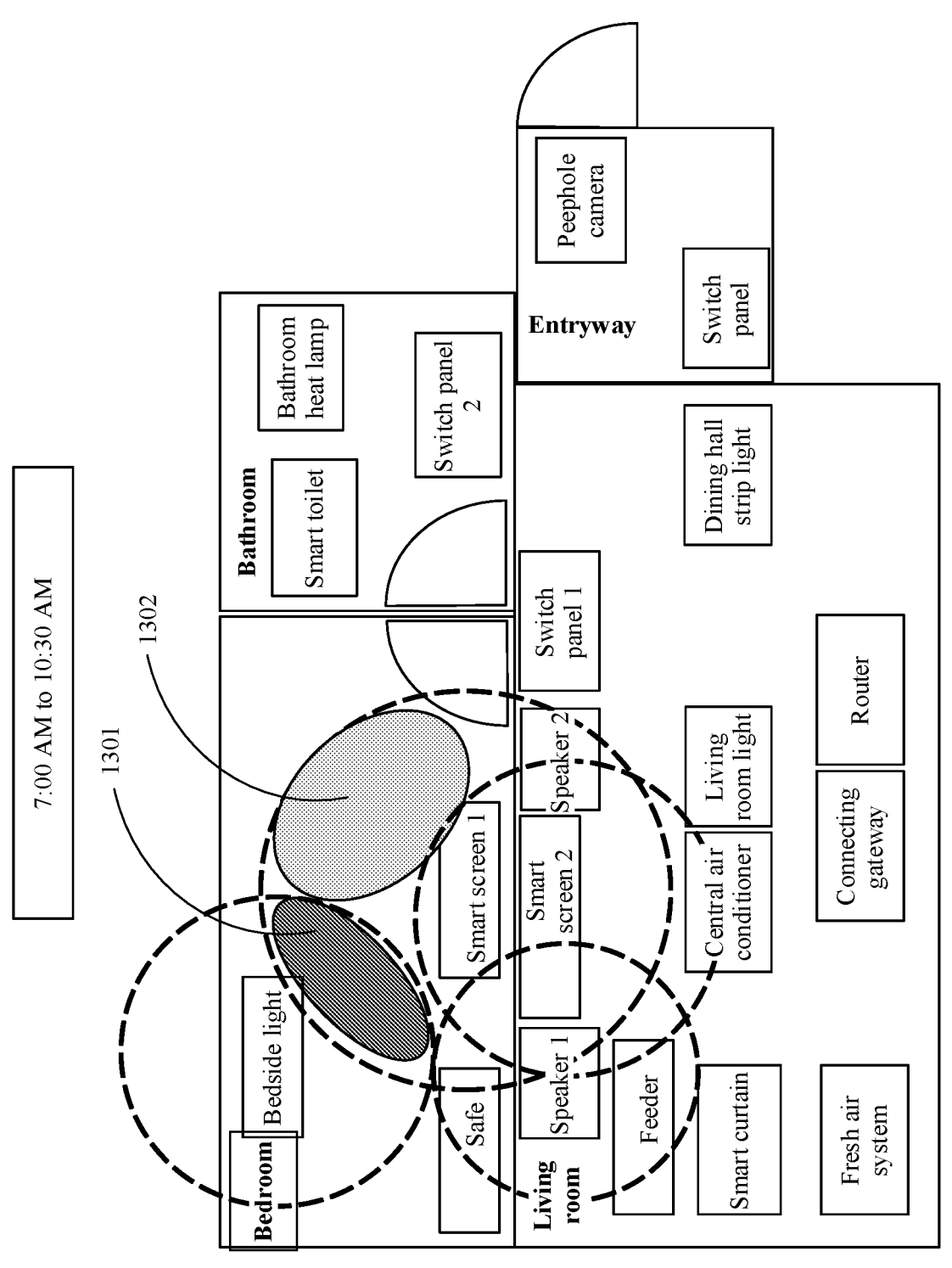
Figure 13B:
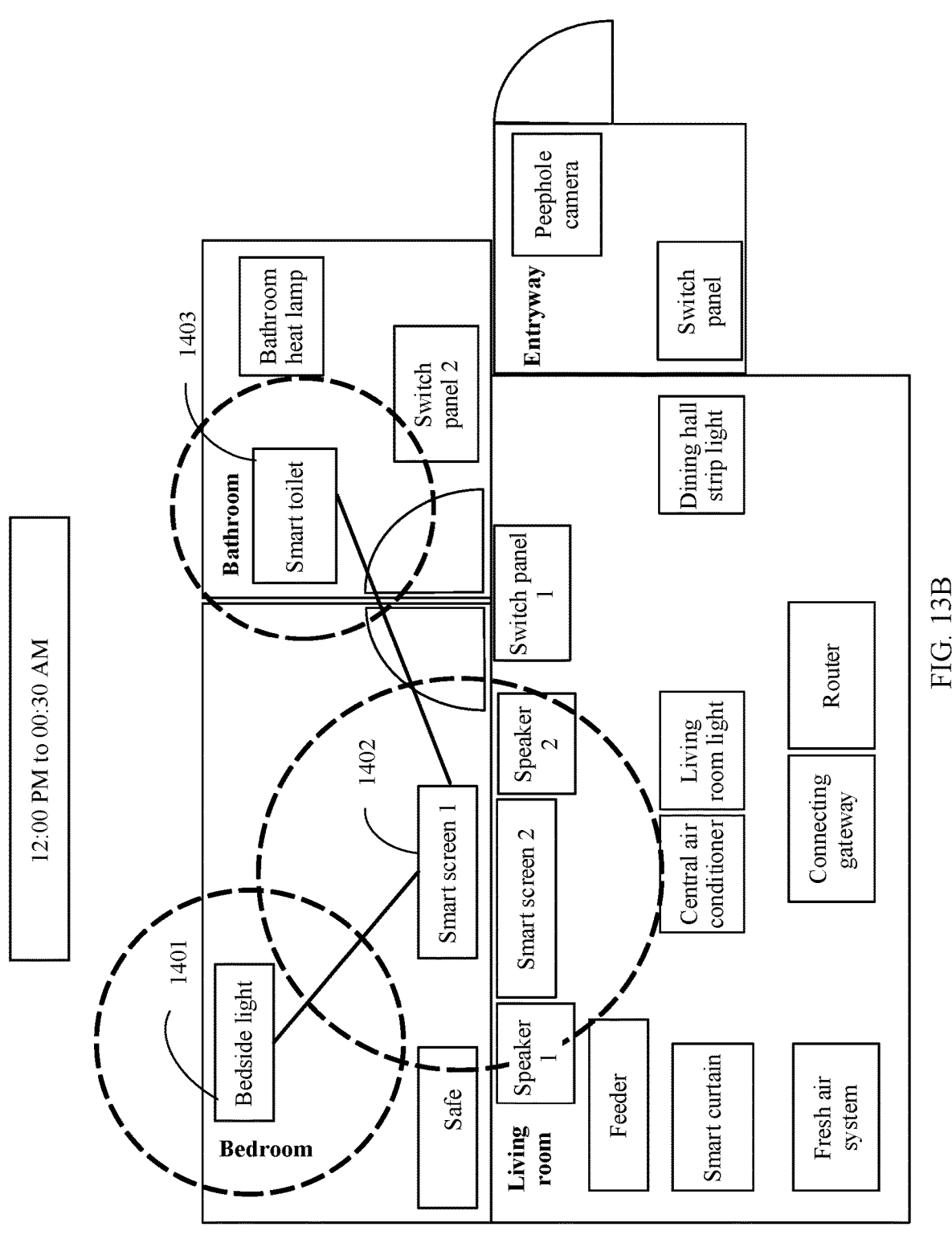
Figure 14A:
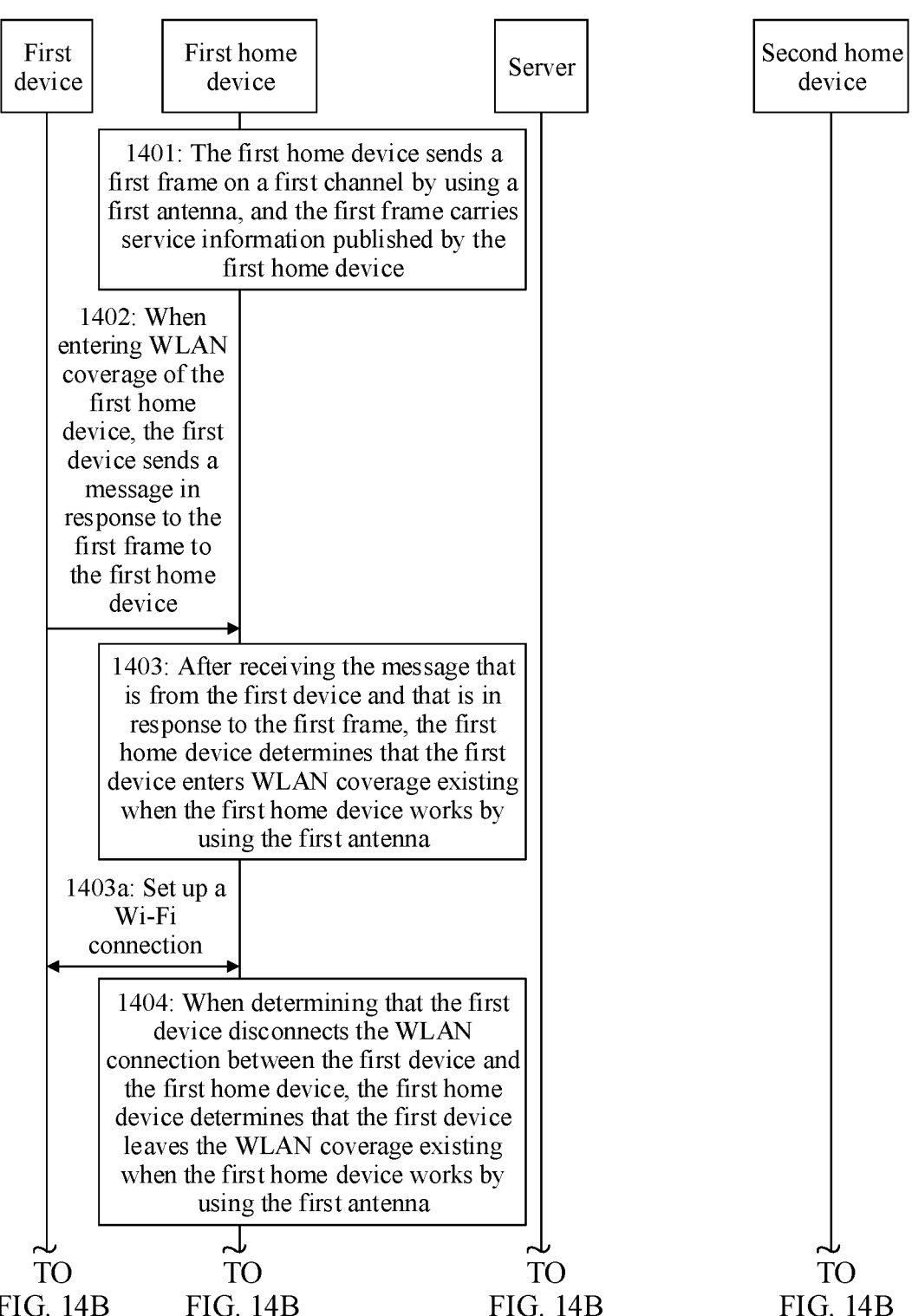
Figure 15:
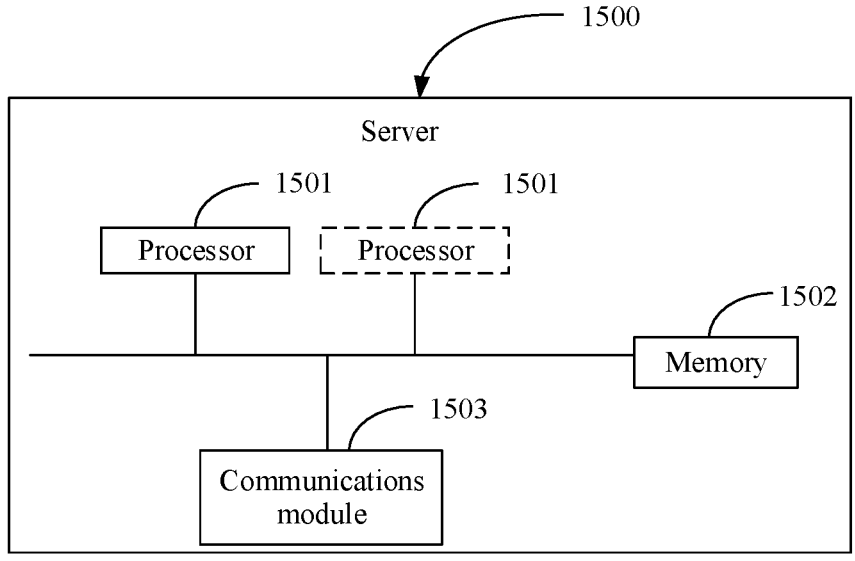
Figure 16:
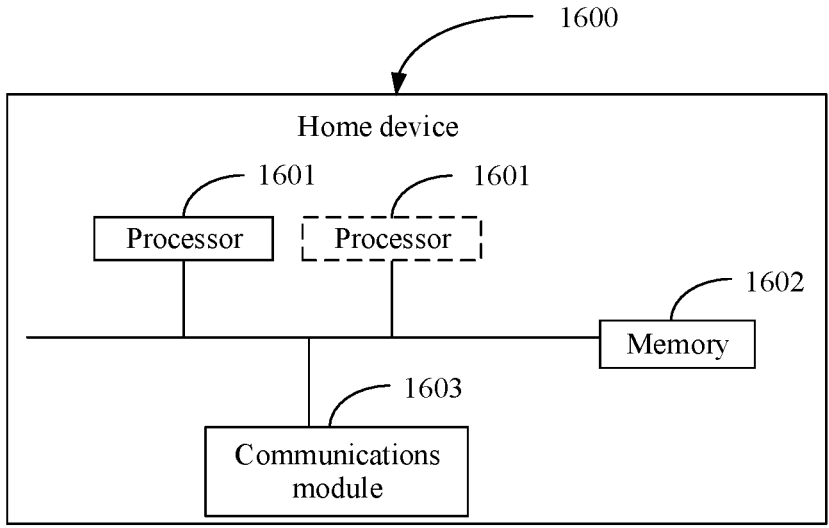
Figure 17:
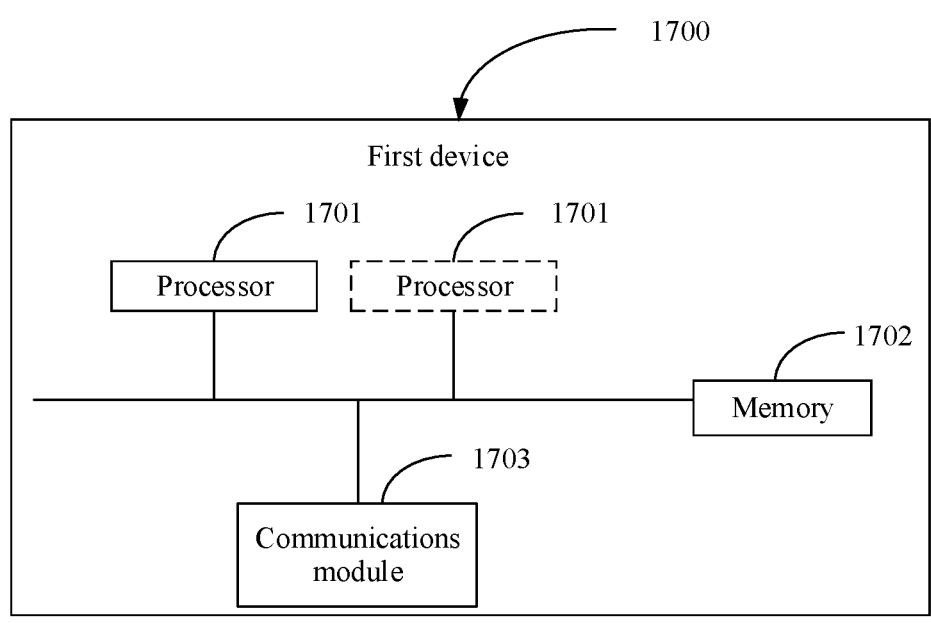
Figure 18:
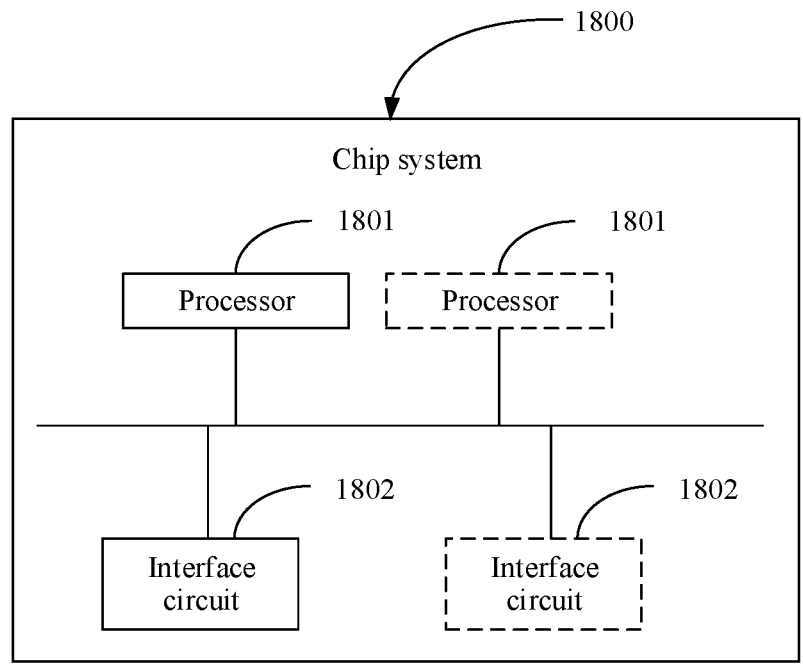

FIG. 4 is another schematic diagram of displaying on an electronic device according to an embodiment of this application;

FIG. 5A(a), FIG. 5A(b), and FIG. 5A(c) are a schematic diagram of a process of determining WLAN coverage of a home device according to an embodiment of this application;

FIG. 5B is a schematic diagram of WLAN coverage of a home device in a living room according to an embodiment of this application;

FIG. 5C is a schematic diagram of WLAN coverage of a home device in a kitchen according to an embodiment of this application;

FIG. 6A is a schematic diagram of a structure of an antenna 1 according to an embodiment of this application;

FIG. 6B is a schematic diagram of another structure of an antenna 1 according to an embodiment of this application;

FIG. 6C is a schematic diagram of another structure of an antenna 1 according to an embodiment of this application;

FIG. 7A is another schematic diagram of displaying on an electronic device according to an embodiment of this application;

FIG. 7B is another schematic diagram of displaying on an electronic device according to an embodiment of this application;

FIG. 8 is a schematic diagram of signal interaction between a home device, a to-be-positioned device, a server, and an AI Life app according to an embodiment of this application;

FIG. 9 is a schematic diagram of WLAN coverage of a home device and a time period in which a to-be-positioned device enters the WLAN coverage of the home device according to an embodiment of this application;

FIG. 10 is a schematic diagram of WLAN coverage of another home device and a time period in which a to-be-positioned device enters the WLAN coverage of the home device according to an embodiment of this application;

FIG. 11 is a schematic diagram of WLAN coverage of another home device and a time period in which a to-be-positioned device enters the WLAN coverage of the home device according to an embodiment of this application;

FIG. 12 is a schematic diagram of WLAN coverage of another home device and a time period in which a to-be-positioned device enters the WLAN coverage of the home device according to an embodiment of this application;

FIG. 13A is a schematic diagram of a heatmap according to an embodiment of this application;

FIG. 13B is a schematic diagram of a movement track according to an embodiment of this application;

FIG. 14A, FIG. 14B, and FIG. 14C are a schematic diagram of signal interaction applicable to a movement track generation method according to an embodiment of this application;

FIG. 15 is a schematic diagram of a structure of a server according to an embodiment of this application;

FIG. 16 is a schematic diagram of a structure of a home device according to an embodiment of this application;

FIG. 17 is a schematic diagram of a structure of a first device according to an embodiment of this application; and FIG. 18 is a schematic diagram of a structure of a chip system according to an embodiment of this application.

DESCRIPTION OF EMBODIMENTS

The following describes technical solutions in embodiments of this application with reference to accompanying drawings in embodiments of this application. In descriptions of this application, unless otherwise stated, "at least one" means one or more, and "a plurality of" means two or more. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Figure 1:
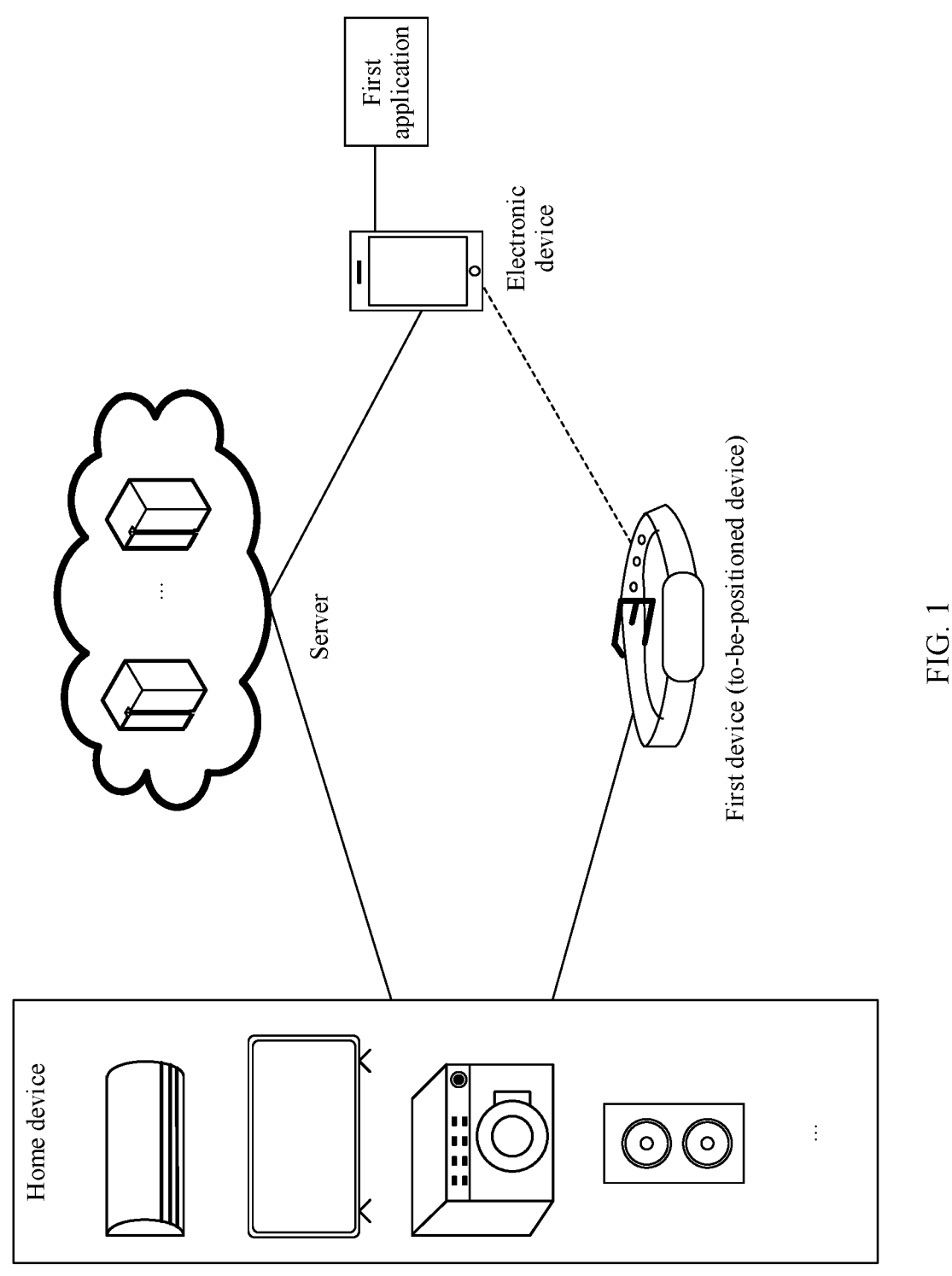
FIG. 1 is a schematic diagram of a system architecture according to an embodiment of this application.

FIG. 1 is a schematic diagram of a system according to an embodiment of this application. The system may include a home device, a server (for example, a server corresponding to HUAWEI CLOUD), an electronic device, and a to-be-positioned device (that is, a first device). A first application (for example, an AI Life application (application, APP)) is installed in the electronic device. The server is a management server of the first application.

For example, the electronic device in this embodiment of this application may be a device on which the first application can be installed, such as a mobile phone, a tablet computer, a desktop computer, a laptop computer, a hand-held computer, a notebook computer, an ultra-mobile personal computer (ultra-mobile personal computer, UMPC), a netbook, a cellular phone, a personal digital assistant (personal digital assistant, PDA), or an augmented reality (augmented reality, AR) or virtual reality (virtual reality, VR) device. A specific form of the electronic device is not specifically limited in this embodiment of this application.

The home device provided in this embodiment of this application may be a device that can access a home wireless local area network, such as a big screen (a smart screen or a television), a stereo, a camera, an air conditioner, a refrigerator, a smart curtain, a desk lamp, a chandelier, an electric cooker, a security protection device (such as a smart electronic lock), or a personal computer (personal computer, PC). In addition, the home device in this embodiment of this application may alternatively be an in-vehicle acoustic device, an in-vehicle air conditioner, or the like. A specific form of the home device is not specially limited in this embodiment of this application. The home device may include a wireless fidelity (wireless fidelity, Wi-Fi) module, to connect to a home local area network.

The to-be-positioned device (the first device) provided in this embodiment of this application may be an electronic collar, a smartwatch, a smart band, a wireless locator, a tracker (Tracker), or the like.

A method provided in this embodiment of this application may be applied to the field of smart homes. The field of smart homes may include scenarios such as home security, indoor surveillance, family care, and pet care.

Currently, in the field of smart homes, a home camera may be used to perform home care in a fixed region or at a fixed angle. When a movement track of a pet or an elderly person needs to be determined, targeted real-time viewing or recording playback needs to be performed on. This is time-consuming and labor-consuming. In addition, a small quantity of cameras installed at home cannot cover every corner of the home, a large quantity of cameras installed at home may cause a privacy leakage risk, and many families do not want to install cameras in locations such as bedrooms and bathrooms. Consequently, a blind region exists in the home, and a complete movement track of a pet or an elderly person at home cannot be well known.

Embodiments of this application provide a movement track generation method. With reference to an ultra-short distance technology and a Wi-Fi aware technology, a first device (for example, a smart collar of a pet or a smart band of an elderly person) can be positioned and a movement track can be generated.

Figure 2:
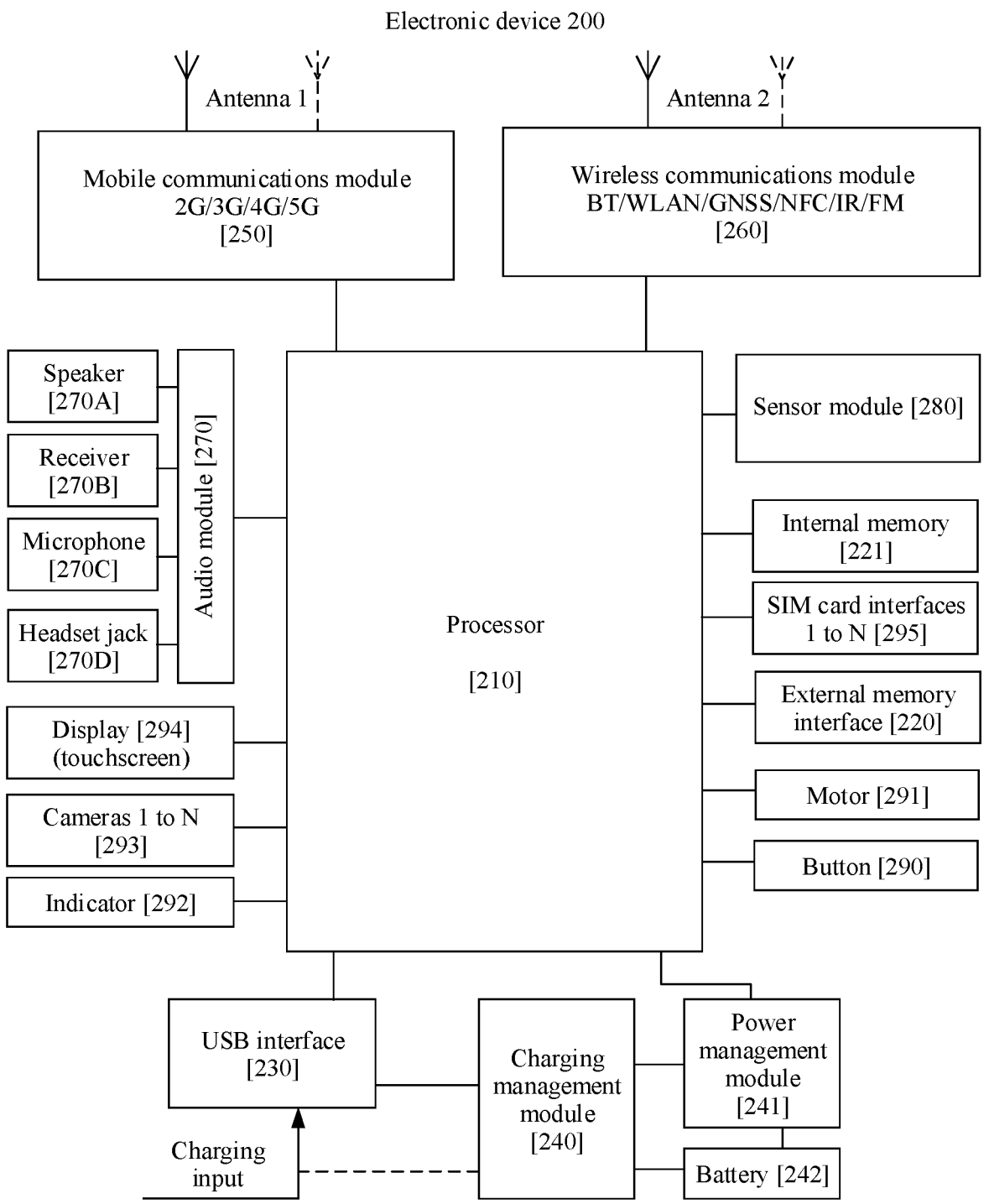
FIG. 2 is a schematic diagram of a structure of an electronic device according to an embodiment of this application.

In this embodiment of this application, an example in which the device shown in FIG. 1 is a mobile phone is used to describe a structure of the electronic device provided in this embodiment of this application. As shown in FIG. 2, the electronic device 200 (for example, a mobile phone) may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identification module, SIM) card interface 295, and the like.

The sensor module 280 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

It may be understood that the structure shown in this embodiment does not constitute a specific limitation on the electronic device 200. In other embodiments, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access, reduces waiting time of the processor 210, and improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is merely an example for description, and does not constitute a limitation on the structure of the electronic device 200. In some other embodiments, the electronic device 200 may alternatively use an interface connection manner different from an interface connection manner in the foregoing embodiment, or use a combination of a plurality of interface connection manners.

The charging management module 240 is configured to receive a charging input from a charger. The charger may be a wireless charger or a wired charger. When charging the battery 242, the charging management module 240 may further supply power to the electronic device by using the power management module 241.

The power management module 241 is configured to connect to the battery 242, the charging management module 240, and the processor 210. The power management module 241 receives an input of the battery 242 and/or an input of the charging management module 240, and supplies power to the processor 210, the internal memory 221, an external memory, the display 294, the camera 293, the wireless communications module 260, and the like. In some embodiments, the power management module 241 and the charging management module 240 may alternatively be disposed in a same component.

A wireless communication function of the electronic device 200 may be implemented through the antenna 1, the antenna 2, the mobile communications module 250, the wireless communications module 260, the modem processor, the baseband processor, and the like. In some embodiments, in the electronic device 200, the antenna 1 and the mobile communications module 250 are coupled, and the antenna 2 and the wireless communications module 260 are coupled, so that the electronic device 200 can communicate with a network and another device by using a wireless communications technology.

The antenna 1 and the antenna 2 are configured to transmit and receive an electromagnetic wave signal. Each antenna in the electronic device 200 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 250 may provide a wireless communication solution that includes 2G/3G/4G/5G or the like and that is applied to the electronic device 200. The mobile communications module 250 may include at least one filter, a switch, a power amplifier, a low noise amplifier (low noise amplifier, LNA), and the like. The mobile communications module 250 may receive an electromagnetic wave through the antenna 1, perform processing such as filtering or amplification on the received electromagnetic wave, and transmit the electromagnetic wave to the modem processor for demodulation.

The mobile communications module 250 may further amplify a signal modulated by the modem processor, and convert the signal into an electromagnetic wave for radiation through the antenna 1. In some embodiments, at least some functional modules in the mobile communications module 250 may be disposed in the processor 210. In some embodiments, at least some functional modules of the mobile communications module 250 may be disposed in a same component as at least some modules in the processor 210.

The wireless communications module 260 may provide a solution, applied to the electronic device 200, to wireless communication including a WLAN (for example, a (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), infrared technology (infrared, IR), and the like. For example, in this embodiment of this application, the electronic device 200 (for example, a first device 110) may access, by using the wireless communications module 260, a temporary network (for example, a Wi-Fi network) provided by a home device 130.

The wireless communications module 260 may be one or more components integrating at least one communications processing module. The wireless communications module 260 receives an electromagnetic wave by the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

The electronic device 200 may implement a display function through the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display a picture, a video, or the like. The display 294 includes a display panel. For example, in this embodiment of this application, the display 294 may be configured to display an application interface of the first APP, such as a device sharing interface, a device search interface, or a two-dimensional code scanning interface.

The electronic device 200 may implement a photographing function through the camera 293, the ISP, the video codec, the GPU, the display 294, the application processor and the like. The ISP is configured to process data fed back by the camera 293. The camera 293 is configured to capture a static image or a video. In some embodiments, the electronic device 200 may include one or N cameras 293, where N is a positive integer greater than 1.

The external memory interface 220 may be configured to connect to an external storage card, for example, a Micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store computer-executable program code. The executable program code includes instructions. The processor 210 executes various function applications and data processing of the electronic device 200 by running the instructions stored in the internal memory 221. For example, in this embodiment of this application, the processor 210 may execute the instructions stored in the internal memory 221, and the internal memory 221 may include a program storage region and a data storage region.

The program storage region may store an operating system, an application required by at least one function (for example, a sound playing function or an image playing function), and the like. The data storage region may store data (such as audio data and a phone book) created when the electronic device 200 is used, and the like. In addition, the internal memory 221 may include a high-speed random access memory, or may include a nonvolatile memory, for example, at least one magnetic disk storage device, a flash memory, or a universal flash storage (universal flash storage, UFS).

The electronic device 200 may implement an audio function, for example, music playing and recording, through the audio module 270, the speaker 270A, the receiver 270B, the microphone 270C, the headset jack 270D, the application processor, and the like.

The button 290 includes a power button, a volume button, and the like. The button 290 may be a mechanical button, or a touch button. The motor 291 may generate a vibration prompt. The motor 291 may be configured to provide an incoming call vibration prompt and a touch vibration feedback. The indicator 292 may be an indicator light, and may be configured to indicate a charging status and a power change, or may be configured to indicate a message, a missed call, a notification, or the like. The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like.

The movement track generation method provided in this embodiment of this application may include the following several procedures:

(1) A user selects or edits a floor plan and home device location in an AI Life App in an electronic device (a control device with a screen, such as a mobile phone, a tablet, or a PC) and uploads the floor plan and home device location to the server.

(2) The server automatically matches WLAN coverage (Wi-Fi coverage) of each home device based on the floor plan and the location of each home device, to ensure full indoor coverage (full home coverage).

(3) When a to-be-positioned device moves indoors, the to-be-positioned device may enter and leave WLAN coverage of different home devices. Based on the WLAN aware technology, entering and leaving information of the to-be-positioned device may be detected by the different home devices. The home device may upload the detected information to the server. The server may identify an identity of the to-be-positioned device, determine location information, a movement track map, a heatmap, or the like of the to-be-positioned device, and may notify the electronic device of an event (that is, send the location information, the movement track (map), and the heatmap of the to-be-positioned device to the electronic device).

(4) Further, the server may perform scenario linkage control, alarm, and the like based on the location information, the movement track map, the heatmap, and the like of the to-be-positioned device.

Figure 3A:
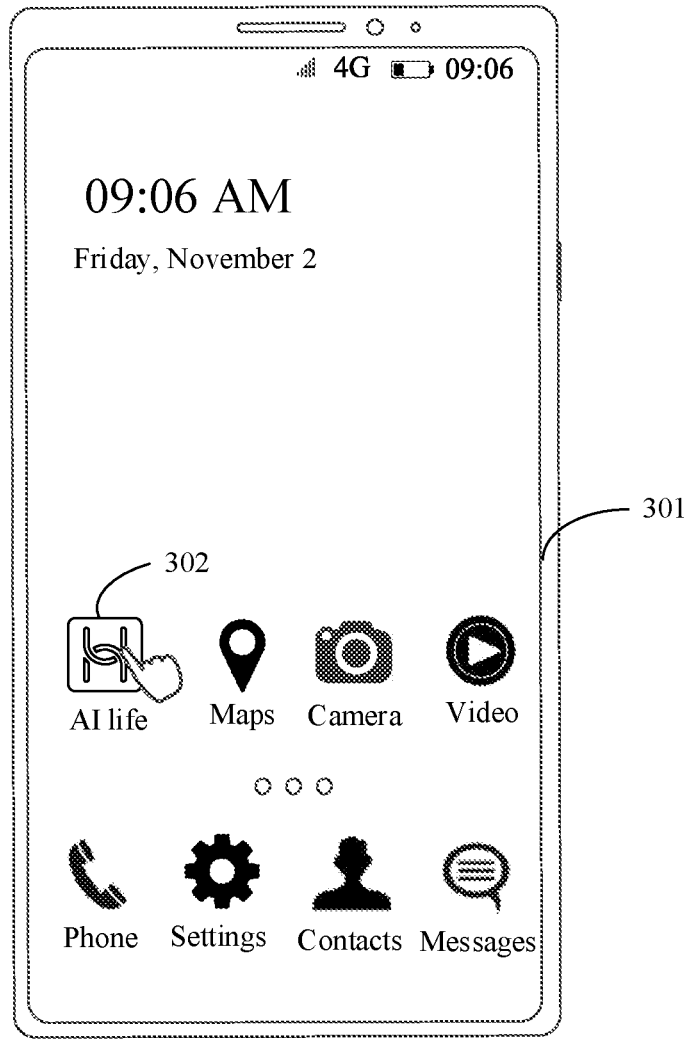
FIG. 3(a), FIG. 3(b), and FIG. 3(c) each are a schematic diagram of displaying on an electronic device according to an embodiment of this application.
Figure 3B:
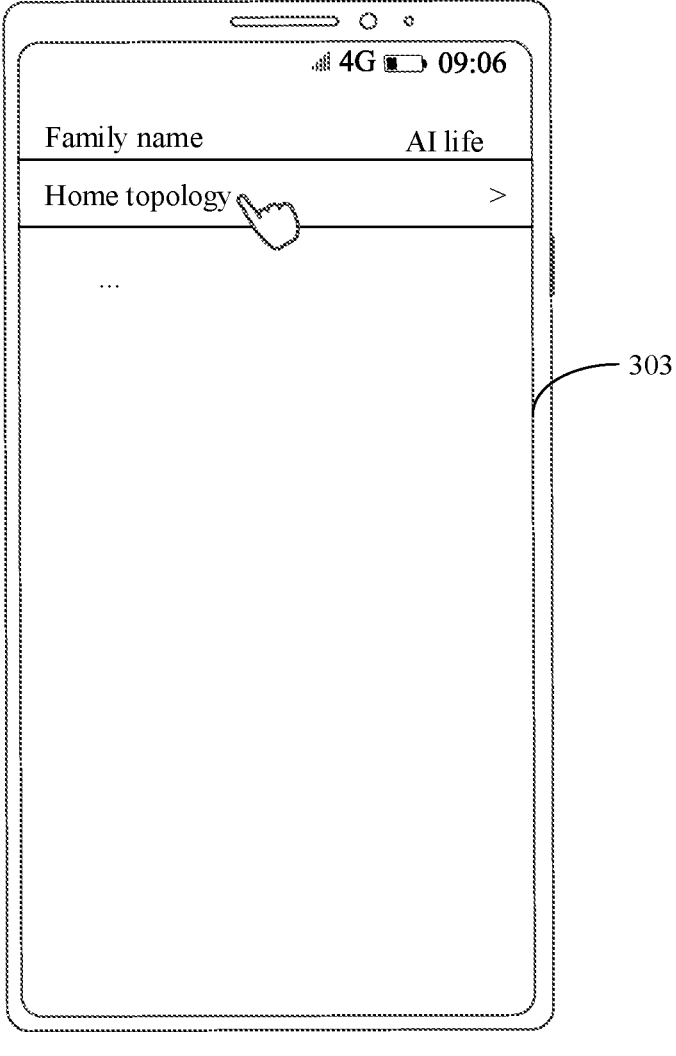
Figure 3C:
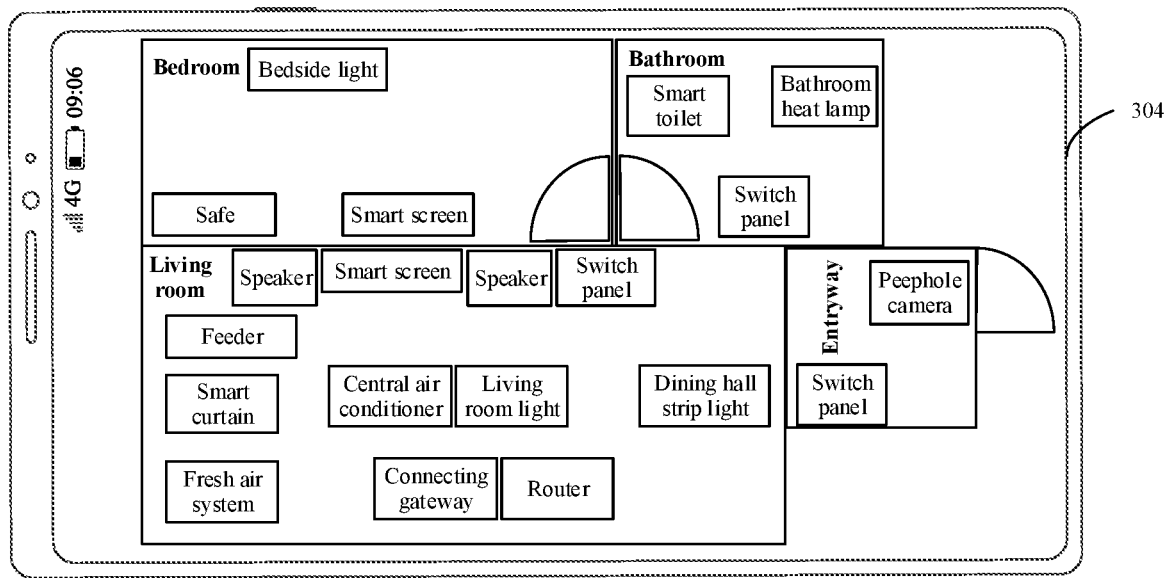

The following describes the procedure (1):

For a whole-house market or a factory-installed market, the server may generate a house type and a home device deployment position diagram for the user based on a selection of the user. The whole-house market or the factory-installed market means that a real estate developer cooperates with a smart home manufacturer, to lay out home devices in a room in a house construction or decoration process. After a user checks in, the user may directly start the home devices in the room without purchasing and installing the home devices. The house type and the home device deployment position diagram may be uploaded to the server by the real estate developer or the smart home manufacturer. For example, as shown in FIG. 3(*a*), a home screen (that is, a desktop) 301 of the mobile phone includes an icon 302 of a smart home application. The mobile phone may receive a tap operation performed by the user on the icon 302 of the smart home application, and in response to the tap operation, the mobile phone may open the smart home application 302. After entering an interface 303 shown in FIG. 3(*b*), the user may tap a home topology option. In response to an operation of tapping the home topology option by the user, the mobile phone may display an interface 304 shown in FIG. 3(*c*). The interface 304 displays the floor plan and the home device location. Optionally, if the user adjusts the location of the home device or adds a new home device, the user may adjust and update the home topology by moving (for example, touching and holding or dragging) a location of a label of the home device in the interface 304.

If the user's house is not performed whole-house customization, the user can scan and import (upload) the floor plan, or manually edit the floor plan. As shown in (a) in FIG. 4, the user may tap an option of editing a floor plan in an interface 401, to enter an interface 402 shown in (b) in FIG. 4. The user may adjust a location of the room through dragging, and the user may further add a room by using a control 404. The user may edit a parameter of the room when selecting the room. For example, after selecting a living room 403, the user may input parameters such as a length and a width of the living room. After obtaining the floor plan of the home, the user may add a label of the home device to a corresponding location in the floor plan, to reflect a real location of the home device at home. The user may add an icon of the smart home device to a corresponding location in the floor plan through dragging, so as to obtain a home topology shown in FIG. 3(*c*). Further, the user may input detailed location information of the smart home device, for example, a height from the ground and a placement direction.

The following describes the procedure (2):

For example, the server may calculate complete coverage of a home region by using a greedy algorithm based on the floor plan and the location of a home device in the floor plan. First, the home region may be rasterized. As shown in FIG. 5A(a), a grid region may be a living room region, and a node A, a node B, a node C, and a node D represent locations of home devices in the living room. Radiuses of circles centered on the node A, the node B, the node C, and the node D may be calculated separately, to implement coverage of the entire grid region in sequence. The following steps may be specifically included:

Step 1: Use a point at an upper left corner of the grid region as a start point, select a node (for example, the node A) closest to the start point, and separately calculate a distance between the node A and the first neighboring nodes or edges of the grid region in four directions (upper, lower, left, and right) by using the node A as a reference. For example, a Euclidean distance between the node A and the node B (the first neighboring node on the right of the node A), a Euclidean distance between the node A and the node C (the first neighboring node below the node A), a distance between the node A and an edge of a left grid region, and a distance between the node A and an edge of an upper grid region may be separately calculated.

Step 2: As shown in FIG. 5A(b), the distance between the node A and the edge of the left grid region may be marked as x, the distance between the node A and the edge of the upper grid region may be marked as y, and half of the Euclidean distance between the node A and the node B and half of the Euclidean distance between the node A and the node C are respectively marked as Rab and Rac. Use a maximum value of four distances (Rab, Rac, x, and y) as the radius of a circle with node A as the center, to form a circle (a coverage circle of the node A). It is assumed that Rab is the maximum value. A circle 501 may be formed by using Rab as a radius and using the node A as a center of the circle, and an area of the circle 501 is a coverage region of a WLAN of the node A.

Step 3: Mark that the node A is calculated, and select a next node that is closest to the start point in the upper left corner from remaining nodes by using a breadth traversal algorithm, to determine a coverage circle of the node. Step 2 is repeated until coverage circles of all nodes are calculated. As shown in FIG. 5A(c), the coverage circle of the node A is the circle 501, a coverage circle of the node B is a circle 502, a coverage circle of the node C is a circle 503, and a coverage circle of the node D is a circle 504.

Step 4: Start from the start point in the upper left corner, search, by using the breadth-priority traversal algorithm or a depth-first traversal algorithm, for a grid/grid that is not covered in the grid region. The grid is used as a center, and a node closest to the grid is searched for through in-depth traversal. For example, if a search result is the node C, a radius of the coverage circle of the node C is changed to a specific length (an original radius plus a step) (for example, the step may be set to 5 cm), and a formula is expressed as: Rcnew=Rcold+Step, where Rcnew represents a radius of a new coverage circle of the node C, Rcold represents a radius of an original coverage circle of the node C, and Step represents a step.

Step 5: Repeat Step 4 until all grids in the grid region are covered. The foregoing greedy algorithm is merely used as an example of calculating network region coverage, and another algorithm for calculating network region coverage may be alternatively used. This is not limited in this application.

Optionally, in a process of calculating the complete coverage of the home region, a balance between power consumption and coverage distances of different powers or different types of home devices may be achieved through weighted calculation based on a power or a type of the home device.

In this way, the server determines the WLAN coverage of the home device based on the floor plan and location information of the home device, and the user does not need to manually set the WLAN coverage, so as to lower a usage threshold for the user.

For example, as shown in FIG. 5B, a living room is used as an example. A home device in the living room usually has no special security or alarm risk. A configuration parameter of each home device may be determined based on a constant low-power consumption requirement when WLAN coverage of the home device can ensure coverage of the entire living room. The configuration parameter is used to indicate precision of the WLAN coverage of the home device, and the precision of the WLAN coverage may be represented by a coverage radius. For another example, as shown in FIG. 5C, for a kitchen, because there is a region such as an oven, a gas stove, or a water heater that causes a risk of injury to a child or a pet, a configuration parameter of a high-precision and small-distance range may be configured for a home device such as the oven, the gas stove, or the water heater. For another device, a configuration parameter is preset based on the constant low-power consumption requirement when coverage of the entire kitchen is ensured. An antenna and a transmit power of the home device are adjusted based on the configuration parameter, so that coverage (for example, 0.1 m to 20+m) of a WLAN aware network of the home device can be adjusted.

For example, at least two antennas (for example, an antenna 1 and an antenna 2) may be disposed in the home device. A minimum wireless transmit power of the home device when the home device works by using the antenna 1 is less than a minimum transmit power of the home device when the home device works by using the antenna 2. For example, a range of the wireless transmit power when the home device works by using the antenna 1 may be 0.1 m to 2 m (for example, may include 10 cm (that is, a region within 10 cm centered on the home device is within a range of the wireless transmit power of the home device), 50 cm, 1 m, and 1.5 m), and a range of the wireless transmit power when the home device works by using the antenna 2 may be 2 m to 20 m (for example, may include 3 m, 5 m, 8 m, and 15 m). It should be understood that, when the home device works by using the antenna 2, a range of the transmit power greater than 20 m may be reached, for example, the range of the transmit power may reach 30 m, 50 m, 100 m, or hundreds or even thousands of meters. However, in this embodiment of this application, a home scenario is mainly considered. For example, considering that a length and a width of a home of 200 square meters should not exceed 20 m, it is relatively appropriate that a range of a wireless transmit power when the home device works by using the antenna 2 is 2 m to 20 m. Certainly, theoretically, the minimum wireless transmit power of the home device when the home device works by using the antenna 2 may also be very small, for example, may reach 0.1 m to 2 m (for example, may include 10 cm, 50 cm, 1 m, and 1.5 m). However, considering that an error is relatively large when the second antenna reaches a relatively small transmit power, when a range of the wireless transmit power of the home device is required to be as small as possible, the antenna 1 may be used; or when a range of the wireless transmit power of the home device is required to be relatively large, the antenna 2 may be used. In this way, by switching different antennas and adjusting transmit power, the range of the wireless transmit power of the home device can reach precise coverage of 0.1 m to 20 m, that is, the range of the WLAN aware network of the home device may reach 0.1 m to 20 m. In addition, the antenna 1 may be referred to as a short antenna, and the antenna 2 may be referred to as a long antenna. When transmitting a signal, the home device may use the short antenna or the long antenna. When receiving a response message sent by the to-be-positioned device, the home device may use the long antenna.

In this embodiment of this application, the two antennas (the antenna 1 and the antenna 2) in the home device may be switched by using a radio frequency switch. Physically, both the antenna 1 and the radio frequency switch may be placed in a shielding can, or the antenna 1 may be placed in a chip. FIG. 6A to FIG. 6C are schematic diagrams of three structures of antennas 1. An objective of the antenna 1 in this embodiment of this application is to reduce a transmitting distance (transmit power) as much as possible. A principle of constructing the antenna 1 may be as follows:

(1) reducing a length of the antenna, to reduce an electromagnetic wave radiated to the air;
  (2) reducing radiation efficiency, and converting, by using a resistor, a part of electromagnetic wave radiation into heat energy to be consumed; and
  (3) reducing a return loss and reflecting partial radio frequency energy back to the chip, and the like.

The antenna 1 may be specifically implemented by:
  (1) shortening the antenna;
  (2) disconnecting a point in a path of a physical antenna, or grounding the point through a resistor, an inductor, or a capacitor; and
  (3) using a shielding can, and the like.

It should be understood that (1) and (2) may be implemented on a PCB board or inside a chip.

For example, as shown in FIG. 6A, an antenna 1a may be directly disconnected by using a radio frequency input/output (radio frequency input/output, RFIO) pin of a Wi-Fi chip in the shielding can.

For example, as shown in FIG. 6B, an antenna 1b may be connected to the ground through a matching component (for example, a resistor) by using the RFIO of the Wi-Fi chip in the shielding can.

For example, as shown in FIG. 6C, an antenna 1c may be connected to a matching component (for example, a resistor) after passing through a chip-matched π-type filter circuit by using the RFIO pin of the Wi-Fi chip in the shielding can, and then to the ground.

The different structures of antennas 1 cooperate with different transmit power (Tx power) of the Wi-Fi chip, so that different ultra-short-haul communication requirements (for example, from 0.1 m to 2 m) can be met.

For example, Table 1 shows communication distances of several different structures of antennas 1 in cooperation with different transmit powers.

TABLE 1

| Antenna structure | Transmit power | |
| --- | --- | --- |
| | Distance at a maximum transmit power | Distance at a minimum transmit power |
| Antenna 1a | 1 m | 10 cm |
| Antenna 1b | 1.5 m | 50 cm |
| Antenna 1c | 2 m | 1 m |

Optionally, on a basis that the server generates the configuration parameter of the WLAN coverage of the home device, the user is supported to manually edit and modify the WLAN coverage of the home device. For example, for a region that needs to be precisely positioned, such as a valuable object region or a vulnerable region, a relatively small WLAN aware range of a home device in the region may be separately set, so that the to-be-positioned device sends an alarm after fully approaching. Alternatively, WLAN aware ranges of a plurality of devices may be adjusted, and precise positioning may be performed through coverage region overlap detection.

In a possible design, as shown in FIG. 7A, the user may enter an interface 601, to view an aware distance of each home device that is automatically generated by the server. The user may adjust an aware distance of a home device, so as to perform precise detection on the to-be-positioned device. For example, if the user expects that a feeder can be aware of proximity of a pet (a collar worn by the pet) in a close distance, the user may adjust an aware distance of the feeder by adjusting a value in an aware distance setting bar 602 of the feeder. After the aware range of the home device is modified, the server may automatically recalculate and set an aware region for another device. For example, the server may recalculate coverage region of another home device based on the aware distance of the feeder adjusted by the user, to implement full home coverage again.

In another possible design, as shown in FIG. 3(*c*), in the home topology, the living room may be selected (for example, a finger taps a living room region), and an interface 701 shown in FIG. 7B is displayed. In response to selecting a home device (for example, a switch panel) by the user, a shadow region 702 (the shadow region 702 may be displayed by using a dynamic effect) may be displayed, and a prompt box 703 is displayed, to prompt the user of an aware distance and WLAN coverage of the switch panel. The user may modify the aware distance of the switch panel in the prompt box 703. The server may recalculate coverage region of another home device based on the aware distance of the switch panel adjusted by the user, to implement full home coverage again. Optionally, the user may alternatively separately set a care region of each device through stopping automatic calculation.

The following describes the procedure (3):

As shown in FIG. 8, the user may enable a WLAN aware service (which may also be referred to as a NAN aware service) of the home device and a WLAN aware service of the to-be-positioned device by using the AI Life APP. The home device may publish (publish) one or more discoverable services, and the to-be-positioned device may subscribe to one or more services published by the home device. The home device may also be referred to as a service publisher, and the to-be-positioned device may also be referred to as a service subscriber. After the WLAN service is enabled, the home device may continuously transmit a target frame (publish frame) on a target channel (a fixed Wi-Fi channel, for example, a channel 6), and the publish frame carries service information published by the home device. After the WLAN aware service is enabled, the to-be-positioned device may continuously scan the fixed Wi-Fi channel (for example, the channel 6). If a publish frame is found by scanning and it is determined that service information included in the publish frame is a service subscribed to by the to-be-positioned device, the to-be-positioned device may return a response message to the home device. The two parties may establish a WLAN connection (for example, establish a Wi-Fi channel on the fixed Wi-Fi channel), and may create a socket (Socket) for data transmission. After the home device receives the response message sent by the to-be-positioned device, the home device may determine that the to-be-positioned device enters the WLAN coverage (geofence) of the home device, and the home device records a to-be-positioned device entry event. For example, the home device may call back WLAN onDiscovery, so as to be aware that the to-be-positioned device enters the WLAN coverage of the home device. When the to-be-positioned device leaves the WLAN coverage of the home device, service discovery may be disabled, that is, the Wi-Fi channel between the to-be-positioned device and the home device is disconnected. When the to-be-positioned device determined by the home device disconnects the Wi-Fi channel between the to-be-positioned device and the home device, the home device determines that the to-be-positioned device leaves the WLAN coverage (geofence) of the home device, and may record a to-be-positioned device leaving event. For example, the home device may call back onDisconnect, so as to be aware that the to-be-positioned device leaves the WLAN coverage of the home device. The home device may report the to-be-positioned device entry and leaving events to the server. Reported information includes: an identifier of the to-be-positioned device, an event type (entry or leaving), and a time point at which the event occurs. The server can implement home linkage and event notification.

When the to-be-positioned device enters an overlapping region of Wi-Fi coverage of two or more home devices, the two or more home devices each can be aware of the to-be-positioned device and report the to-be-positioned device entry event to the server.

For example, as shown in FIG. 9, it is assumed that the to-be-positioned device is located in WLAN coverage of a first home device (for example, a speaker 1) in a first time period, and at a start moment of the first time period, the to-be-positioned device enters the WLAN coverage of the speaker 1, and the speaker 1 may report the to-be-positioned device entry event to the server. The entry event corresponds to a timestamp, and the timestamp is used to indicate a moment at which the to-be-positioned device enters the WLAN coverage of the speaker 1, that is, the start moment of the first time period. At an end moment of the first time period, the to-be-positioned device leaves the WLAN coverage of the speaker 1, and the speaker 1 may report the to-be-positioned device leaving event to the server. The leave event corresponds to a timestamp, and the timestamp is used to indicate a moment at which the to-be-positioned device leaves the WLAN coverage of the speaker 1, that is, the end moment of the first time period. The to-be-positioned device is located in WLAN coverage of a second home device (for example, a large screen) in a second time period, and at a start moment of the second time period, the to-be-positioned device enters the WLAN coverage of the large screen, and the large screen may report the to-be-positioned device entry event to the server. At an end moment of the second time period, the to-be-positioned device leaves the WLAN coverage of the large screen, and the large screen may report the to-be-positioned device leaving event to the server. In an overlapping part (overlapping time period) between the first time period and the second time period, the to-be-positioned device is located in an overlapping region of the speaker 1 and the Wi-Fi coverage of the large screen. That is, it may be considered that, in a time period between the start moment of the first time period and the start moment of the second time period, the to-be-positioned device is located in a part that is of the WLAN coverage of the speaker 1 and that does not overlap the WLAN coverage of the large screen; in a time period between the start moment of the second time period and the end moment of the first time period, the to-be-positioned device is located in a part that is of in the WLAN coverage of the speaker 1 and that overlaps the WLAN coverage of the large screen; and in a time period between the end moment of the first time period and the end moment of the second time period, the to-be-positioned device is located in a part that is of the WLAN coverage of the large screen and that does not overlap the WLAN coverage of the speaker 1.

It should be noted that for a same to-be-positioned device, there may be one or more entry/leaving events (entering and leaving Wi-Fi coverage of different home devices). If the to-be-positioned device has a plurality of entry/leaving events, the server may perform event normalization on the plurality of entry or leaving events in a time sequence, so as to determine a location and a movement track (motion track)

of the to-be-positioned device, so that a movement status and a stay (residence) status of the to-be-positioned device in an indoor environment can be clearly learned.

The following uses an example to describe how the server determines the movement track of the to-be-positioned device based on entry and leaving information detected by different home devices.

As shown in FIG. 10, based on the entry/leaving event reported by the speaker 1, the server may determine that the to-be-positioned device is located in WLAN coverage of the speaker 1 in the first time period. The server may determine, based on the entry/leaving event reported by the large screen, that the to-be-positioned device is located in the WLAN coverage of the large screen in the second time period. In the time period between the start moment of the second time period and the end moment of the first time period, the to-be-positioned device is located in an overlapping region (overlapping region 1) of the WLAN coverage of the speaker 1 and the WLAN coverage of the large screen. The server may determine, based on an entry/leaving event reported by the air conditioner, that the to-be-positioned device is located in WLAN coverage of the air conditioner in a third time period. In a time period between a start moment of the third time period and the end moment of the second time period, the to-be-positioned device is located in an overlapping region (overlapping region 2) of the WLAN coverage of the large screen and the WLAN coverage of the air conditioner. The server may determine, based on an entry/leaving event reported by a speaker 2, that the to-be-positioned device is located in WLAN coverage of the speaker 2 in a fourth time period. In a time period in which the third time period ends and the fourth time period does not start, the to-be-positioned device is located in a coverage hole (a WLAN of any home device does not cover the region).

Based on a case shown in FIG. 10, in an example, as shown in FIG. 11, it may be assumed that the to-be-positioned device is located at a central location 1101 of the WLAN coverage of the speaker 1 at a middle moment 1111 of the first time period, the to-be-positioned device is located at a central location 1102 of the WLAN coverage of the large screen at a middle moment 1112 of the second time period, the to-be-positioned device is located at a central location 1103 of the WLAN coverage of the air conditioner at a middle moment 1113 of the third time period, and the to-be-positioned device is located at a central location 1104 of the WLAN coverage of the speaker 2 at a middle moment 1114 of the fourth time period. The four locations at the foregoing four moments are connected, to form a track, and it may be considered that the track is the track of the to-be-positioned device from the start moment of the first time period to the end moment of the fourth time period.

Based on the case shown in FIG. 10, in another example, as shown in FIG. 12, it may be assumed that the to-be-positioned device is located at a central location 1201 of a region that is of the WLAN coverage of the speaker 1 and that does not overlap the WLAN coverage of the large screen at a middle moment 1211 of the time period between the start moment of the first time period and the start moment of the second time period; the to-be-positioned device is located at a central location 1202 of a region that is of the WLAN coverage of the speaker 1 and that overlaps the WLAN coverage of the large screen at a middle moment 1212 of the time period between the start moment of the second time period and the end moment of the first time period; the to-be-positioned device is located at a central location 1203 of a region that is of the WLAN coverage of the large screen and that does not overlap the WLAN coverage of the speaker 1 and the WLAN coverage of the air conditioner at a middle moment 1213 of the time period between the end moment of the first time period and the start moment of the third time period; the to-be-positioned device is located at a central location 1204 of a region that is of the WLAN coverage of the large screen and that overlaps the WLAN coverage of the air conditioner at a middle moment 1214 of the time period between the start moment of the third time period and the end moment of the second time period; the to-be-positioned device is located at a central location 1205 of a region that is of the WLAN coverage of the air conditioner and that does not overlap the WLAN coverage of the large screen at a middle moment 1215 of the time period between the end moment of the second time period and the end moment of the third time period; and the to-be-positioned device is located at a central location 1206 of the WLAN coverage of the speaker 2 at a middle moment 1216 of the fourth time period. The six locations at the foregoing six moments are connected, to form a track, and it may be considered that the track is the track of the to-be-positioned device from the start moment of the first time period to the end moment of the fourth time period.

In addition, a heatmap of the to-be-positioned device may be drawn based on the movement track of the to-be-positioned device and duration of staying at different places on the movement track. The heatmap may describe an indoor movement status and stay duration of the to-be-positioned device. Different colors, colors of different shades (different gray scales), or different textures may be used to indicate the stay duration of the to-be-positioned device at a corresponding location. A deeper color indicates longer stay duration. As shown in FIG. 13A, it is assumed that the to-be-positioned device is always located in coverage region 1301 from 7 a.m. to 10 a.m., and the coverage region 1301 is a WLAN coverage region shared by a bedside lamp and a smart screen 1 (a smart screen in a bedroom). From 10:00 to 10:30, the to-be-positioned device leaves the coverage region 1301 and is located in a coverage region 1302. The coverage region 1302 is a WLAN coverage region, in a WLAN coverage region of the smart screen 1, except the coverage region 1301, a shared WLAN coverage region of the smart screen 1 and the speaker 1, a shared WLAN coverage region of the smart screen 1 and the smart screen 2. That is, the to-be-positioned device is located in the coverage region 1301 for three hours and is located in the coverage region 1302 for 0.5 hour. In this case, a color of the coverage region 1301 may be relatively deep, and a color of the coverage region 1302 may be relatively light, so that a stay status of the to-be-positioned device is intuitively represented.

The following describes the procedure (4):

Optionally, when the to-be-positioned device is registered with the server, the server may assign a unique identifier (a first identifier) to the to-be-positioned device, and the first identifier is associated with a first biometric identity, or the first identifier is associated with a specific biometric recognition subject (a person or an animal). The person or the animal associated with the to-be-positioned device may be determined based on the first identifier, so that care for the specific biometric recognition subject can be implemented. The user can set a corresponding scenario linkage rule or alarm rule for the to-be-positioned device in the AI Life APP. The server determines whether to trigger scenario linkage or alarm based on the location information, track map, and heatmap of the to-be-positioned device. If the scenario linkage trigger condition is met, the server triggers alarm and linkage control.

The scenario linkage rule may include a scenario linkage trigger condition and a linkage control behavior (that is, controlling a target device to perform a target event). When the scenario linkage trigger condition is met, the linkage control behavior may be performed (that is, controlling the target device (the target device may be the first device, the home device, or another device, and this is not limited in this application) to perform the target event). The scenario linkage trigger condition may include N attributes. The scenario linkage trigger condition is met, that is, the N attributes that meet the linkage trigger condition are met simultaneously. Attributes of the scenario linkage trigger condition may include, for example, a biological attribute, a range attribute, a time attribute (including a moment attribute (a moment at which a user enters and leaves a range) and a duration attribute (duration of staying in a range)) associated with the range attribute, and the like. For example, if it is detected that a collar (representing a pet dog) worn by a pet dog enters a range (within 30 cm) of a feeding machine within a time period from 8 a.m. to 10 a.m. and remains for more than 30s, the feeding machine is controlled to feed. The scenario linkage trigger condition is as follows: A pet dog (biological attribute) enters the range of the feeding machine for 30 cm (range attribute) at 8:00 a.m. to 10:00 a.m. (a moment attribute, an entry moment belongs to 8:00 a.m. to 10:00 a.m.) and stays for more than 30s (duration attribute). The linkage control behavior is: controlling the feeding machine to feed.

For another example, it may be determined, based on a track map or a heatmap of an elderly person living alone in a period of time, whether the elderly person is abnormal (for example, ill), so as to perform family care in time. As shown in FIG. 13B, it is assumed that the to-be-positioned device is a band worn by the elderly person. From 12:00 p.m. to 00:30 a.m., a track of the band may be obtained by connecting a central location of WLAN coverage of a bedside light 1401, a central location of WLAN coverage of (the smart screen 1) 1402, and a central location of WLAN coverage of a smart toilet 1403, that is, the band moves from the bedroom to the toilet. If the band stays in the WLAN coverage of the smart toilet for more than 30 minutes, it is predicted that the elderly person may fall in the toilet. In this case, an intelligent alarm may be used to notify the electronic device to pay attention to a status of the elderly person in time. For another example, as shown in FIG. 13A, it is assumed that the to-be-positioned device is a band worn by the elderly person. It can be learned, based on a heatmap of the band, that the elderly person is in a bedroom for 3.5 consecutive hours from 7 a.m. It is determined that the elderly person may be in bed due to a reason such as illness, and an intelligent alarm may be further sent to the electronic device (for example, a mobile phone), so that a user of the mobile phone can perform rescue for the elderly person in time.

According to the method provided in this embodiment of this application, the server may receive a first message sent by the first home device (for example, the speaker 1), and the first message is used to indicate that the to-be-positioned device enters or leaves the WLAN coverage of the first home device; and the server may further receive a second message sent by the second home device (for example, the large screen), and the second message is used to indicate that the to-be-positioned device enters or leaves the WLAN coverage of the second home device. In this way, the server may determine, based on the first message or the second message, the location information of the to-be-positioned device (for example, in the WLAN coverage of the first home device, or in the WLAN coverage of the second home device, or in an overlapping region of the WLAN coverage of the first home device and the WLAN coverage of the second home device), that is, may position on the to-be-positioned device (for example, the smart collar of the pet or the smart band of the elderly person). In addition, the server may generate the movement track of the to-be-positioned device based on the first message and the second message. The movement track of the to-be-positioned device includes location coordinates of the first home device and location coordinates of the second home device. For example, the movement track of the to-be-positioned device may be moving from the WLAN coverage of the first home device to the WLAN coverage of the second home device, or moving from the WLAN coverage of the second home device to the WLAN coverage of the first home device.

Certainly, the server may further receive messages (a third message, a fourth message, and the like) sent by more home devices (for example, an air conditioner, and the speaker 2). In this way, the server may more accurately generate the movement track of the to-be-positioned device based on the first message, the second message, the third message, and the fourth message. For a specific process, refer to the foregoing related descriptions. Details are not described herein again.

As shown in FIG. 14A, FIG. 14B, and FIG. 14C, an embodiment of this application provides a movement track generation method. The method includes the following steps.

1401: A first home device sends a first frame on a first channel by using a first antenna, and the first frame carries service information published by the first home device.

The first home device includes the first antenna and a second antenna, and WLAN coverage existing when the first home device works by using the first antenna is less than WLAN coverage existing when the first home device works by using the second antenna.

For example, when the first home device works by using the first antenna, the WLAN coverage is 0.1 m to 2 m; and when the first home device works by using the second antenna, the WLAN coverage is 2 m to 20 m. For the first antenna, refer to the foregoing related description of the antenna 1 of the home device. For the second antenna, refer to the foregoing related description of the antenna 2 of the home device. Details are not described herein again.

1402: When entering the WLAN coverage of the first home device, the first device sends a message in response to the first frame to the first home device.

1403: After receiving the message that is from the first device and that is in response to the first frame, the first home device determines that the first device enters the WLAN coverage existing when the first home device works by using the first antenna.

1403*a*: The first home device establishes a WLAN connection to the first device.

1404: When determining that the first device disconnects the WLAN connection between the first device and the first home device, the first home device determines that the first device leaves the WLAN coverage existing when the first home device works by using the first antenna.

1405: The first home device sends a first message to a server, and the first message is used to indicate that the first device enters or leaves the WLAN coverage of the first home device.

It should be noted that, in a possible design, the first home device may send the first message to the server after determining that the first device enters the WLAN coverage existing when the first home device works by using the first antenna, and the first message is used to indicate that the first device enters the WLAN coverage of the first home device. The first home device may send the first message (a second message) to the server after determining that the first device leaves the WLAN coverage existing when the first home device works by using the first antenna, and the first message (the second message) is used to indicate that the first device leaves the WLAN coverage of the first home device. Alternatively, the first home device may send the first message to the server based on a preset time interval (for example, 30 minutes, 1 hour, or 2 hours), and the first message is used to indicate that the first device enters and/or leaves the WLAN coverage of the first home device. For example, within a preset time interval, if the first device enters the WLAN coverage of the first home device and then leaves the WLAN coverage of the first home device, the first home device may send the first message to the server, and the first message is used to indicate that the first device enters and leaves the WLAN coverage of the first home device.

1406: The server receives the first message sent by the first home device.

1407: The second home device sends a second frame on a second channel by using a third antenna, and the second frame carries service information published by the second home device.

The second home device includes the third antenna and a fourth antenna, and WLAN coverage existing when the second home device works by using the third antenna is less than WLAN coverage existing when the second home device works by using the fourth antenna.

For example, when the second home device works by using the third antenna, the WLAN coverage is 0.1 m to 2 m; and when the second home device works by using the fourth antenna, the WLAN coverage is 2 m to 20 m. For the third antenna, refer to the foregoing related description of the antenna 1 of the home device. For the fourth antenna, refer to the foregoing related description of the antenna 2 of the home device. Details are not described herein again.

1408: When entering the WLAN coverage of the second home device, the first device sends a message in response to the second frame to the second home device.

1409: After receiving the message that is from the first device and that is in response to the second frame, the second home device determines that the first device enters the WLAN coverage existing when the second home device works by using the third antenna.

1409a: The second home device establishes a WLAN connection to the first device.

1410: When determining that the first device disconnects the WLAN connection between the first device and the second home device, the second home device determines that the first device leaves the WLAN coverage existing when the second home device works by using the third antenna.

1411: The second home device sends the second message to the server, and the second message is used to indicate that the first device enters or leaves the WLAN coverage of the second home device.

1412: The server receives the second message sent by the second home device.

It should be noted that a sequence of step 1407 to step 1412 and step 1401 to step 1406 is not limited in this application. To be specific, step 1401 to step 1406 may be first performed, and then step 1407 to step 1412 are performed; or step 1407 to step 1412 are first performed, and then step 1401 to step 1406 are performed; or step 1407 to step 1412 and step 1401 to step 1406 may be simultaneously performed.

1413: The server generates a movement track of the first device based on the first message and the second message, and the movement track of the first device includes location coordinates of the first home device and location coordinates of the second home device.

The server may receive a floor plan, the location coordinates of the first home device, and the location coordinates of the second home device from the second device. In a case of whole-house customization, the second device may be a server of a home device manufacturer or a real estate manufacturer; and in a case of non-whole-house customization, the second device may be an electronic device. The server may determine the WLAN coverage of the first home device and the WLAN coverage of the second home device based on the floor plan, the location coordinates of the first home device, and the location coordinates of the second home device.

The first device may be located in the WLAN coverage of the first home device in a first time period; the first device may be located in the WLAN coverage of the second home device in a second time period; and if the first time period and the second time period have an overlapping part, the first device is located in an overlapping region of the WLAN coverage of the first home device and the WLAN coverage of the second home device in the overlapping part, and the movement track of the first device includes location coordinates of a center of the overlapping region.

Optionally, the server may receive the third message sent by the third home device, and the third message is used to indicate that the first device enters or leaves WLAN coverage of the third home device. The server generates the movement track of the first device based on the first message, the second message, and the third message, and the movement track of the first device includes the location coordinates of the first home device, the location coordinates of the second home device, and location coordinates of the third home device. Similarly, the server may further receive messages sent by more other home devices (for example, a fourth home device and a fifth home device), and the server may generate the movement track of the first device based on the received messages. For a specific process, refer to the foregoing descriptions. Details are not described herein again.

Optionally, the server may allocate a first identifier to the first device, and the first identifier is associated with a first biometric identity.

Optionally, the server may determine a heatmap based on location information of the first device and time information corresponding to the location information. The location information of the first device includes the WLAN coverage of the first home device and the WLAN coverage of the second home device. The time information corresponding to the location information includes duration in which the first device is located in the WLAN coverage of the first home device and duration in which the first device is located in the WLAN coverage of the second home device.

Further, the server may send the third message to the electronic device. A first application is installed on the electronic device, the server is the server corresponding to the first application, and the third message includes at least one of the location information, the movement track, and the heatmap of the first device.

Further, the server may perform scenario linkage control or alarm based on the at least one of the location information, the movement track, and the heatmap of the first device. For example, the server determines whether a scenario linkage trigger condition is met, and if the scenario linkage trigger condition is met, controls a target device to perform a target event. The scenario linkage trigger condition includes N attributes, the N attributes include at least one of a biological attribute, a range attribute, and a time attribute associated with the range attribute, and N is an integer greater than or equal to 1.

According to the method provided in this embodiment of this application, the server may receive the first message sent by the first home device, and the first message is used to indicate that the first device enters or leaves the WLAN coverage of the first home device; and the server may further receive the second message sent by the second home device, and the second message is used to indicate that the first device enters or leaves the WLAN coverage of the second home device. In this way, the server may determine, based on the first message or the second message, the location information of the first device (for example, in the WLAN coverage of the first home device or in the WLAN coverage of the second home device), that is, may position the first device (for example, a smart collar of a pet or a smart band of an elderly person). In addition, the server may generate the movement track of the first device based on the first message and the second message, and the movement track of the first device includes the location coordinates of the first home device and the location coordinates of the second home device. For example, the movement track of the first device may be moving from the WLAN coverage of the first home device to the WLAN coverage of the second home device, or moving from the WLAN coverage of the second home device to the WLAN coverage of the first home device.

Some other embodiments of this application provide an electronic device (the electronic device 200 shown in FIG. 2). The electronic device may include a communications module, a memory, and one or more processors. The communications module, the memory, and the processor are coupled. The memory is configured to store computer program code. The computer program code includes computer instructions.

Another embodiment of this application provides a server. As shown in FIG. 15, a server 1500 includes a communications module 1503, a memory 1502, and one or more processors 1501. The communications module 1503, the memory 1502, and the processor 1201 are coupled. The memory 1502 is configured to store computer program code, where the computer program code includes computer instructions. When the computer instructions are executed by the processor 1501, the server 1500 is enabled to perform the functions or steps performed by the server in the foregoing method embodiment.

Another embodiment of this application provides a home device. The home device may be the first home device or the second home device. As shown in FIG. 16, a home device 1600 includes a communications module 1603, a memory 1602, and one or more processors 1601. The communications module 1603, the memory 1602, and the processor 1601 are coupled. For example, the communications module 1603 may be a Wi-Fi module.

The memory 1602 is configured to store computer program code, where the computer program code includes computer instructions. When the computer instructions are executed by the processor 1601, the home device 1600 is enabled to perform the functions or steps of the home device in the foregoing method embodiment.

Another embodiment of this application provides a first device. The first device may be a to-be-positioned device. As shown in FIG. 17, a first device 1700 includes a communications module 1703, a memory 1702, and one or more processors 1701. The communications module 1703, the memory 1702, and the processor 1701 are coupled. For example, the communications module 1703 may be a Wi-Fi module.

The memory 1702 is configured to store computer program code, where the computer program code includes computer instructions. When the computer instructions are executed by the processor 1701, the first device 1700 is enabled to perform the functions or steps performed by the to-be-positioned device in the foregoing method embodiment.

Another embodiment of this application provides a chip system. As shown in FIG. 18, the chip system includes at least one processor 1801 and at least one interface circuit 1802. The processor 1801 and the interface circuit 1802 may be connected to each other through a line. For example, the interface circuit 1802 may be configured to receive a signal from another apparatus (for example, a memory in an electronic device, a memory in a home device, or a memory in a server). For another example, the interface circuit 1802 may be configured to send a signal to another apparatus (for example, the processor 1801).

For example, the interface circuit 1802 may read instructions stored in the memory in the electronic device, and send the instructions to the processor 1801. When the instructions are executed by the processor 1801, the electronic device (for example, the electronic device 200 shown in FIG. 2) may be enabled to perform the steps in the foregoing embodiments.

For another example, the interface circuit 1802 may read instructions stored in the memory in the home device, and send the instructions to the processor 1801. When the instructions are executed by the processor 1801, the server (for example, the server 1500 shown in FIG. 15) is enabled to perform the steps in the foregoing embodiment.

For another example, the interface circuit 1802 may read instructions stored in the memory in the server, and send the instructions to the processor 1801. When the instructions are executed by the processor 1801, the home device (for example, the home device 1600 shown in FIG. 16) is enabled to perform steps in the foregoing embodiment.

For another example, the interface circuit 1802 may read instructions stored in the memory in the first device, and send the instructions to the processor 1801. When the instructions are executed by the processor 1801, the first device (for example, the first device 1700 shown in FIG. 17) is enabled to perform steps in the foregoing embodiment.

Certainly, the chip system may further include another discrete device. This is not specifically limited in this embodiment of this application.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions according to embodiments of this application essentially, or the part contributing to the current technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A movement track generation method, comprising:
determining, by a server, a wireless local area network (WLAN) coverage of a first home device and a WLAN coverage of a second home device based on a floor plan, location coordinates of the first home device, and location coordinates of the second home device;
receiving, by the server, a first message sent by the first home device, wherein the first message indicates that a first device enters or leaves the WLAN coverage of the first home device;
receiving, by the server, a second message sent by the second home device, wherein the second message indicates that the first device enters or leaves the WLAN coverage of the second home device; and
generating, by the server, a movement track of the first device based on the first message and the second message, wherein the movement track of the first device comprises the location coordinates of the first home device and the location coordinates of the second home device; and
determining, by the server, a heatmap based on location information of the first device and time information corresponding to the location information, wherein the location information of the first device comprises the WLAN coverage of the first home device and the WLAN coverage of the second home device.

2. The movement track generation method according to claim 1, wherein:
the first device is located in the WLAN coverage of the first home device in a first time period;
the first device is located in the WLAN coverage of the second home device in a second time period; and
the first time period and the second time period have an overlapping period, the first device is located in an overlapping region of the WLAN coverage of the first home device and the WLAN coverage of the second home device during the overlapping period, and the movement track of the first device comprises location coordinates of a center of the overlapping region.

3. The movement track generation method according to claim 1, wherein
the first home device comprises a first antenna and a second antenna, and a WLAN coverage of the first home device when using the first antenna is less than a WLAN coverage of the first home device when using the second antenna.

4. The movement track generation method according to claim 1, wherein
the second home device comprises a third antenna and a fourth antenna, and a WLAN coverage of the second home device when using the third antenna is less than a WLAN coverage of the second home device when using the fourth antenna.

5. The movement track generation method according to claim 3, wherein
the WLAN coverage of the first home device when using the first antenna is 0.1 m to 2 m.

6. The movement track generation method according to claim 4, wherein
the WLAN coverage of the second home device when using the third antenna is 0.1 m to 2 m.

7. The movement track generation method according to claim 1, wherein the movement track generation method further comprises:
receiving, by the server, the floor plan, the location coordinates of the first home device, and the location coordinates of the second home device from a second device.

8. The movement track generation method according to claim 1, wherein the movement track generation method further comprises:
allocating, by the server, a first identifier to the first device, wherein the first identifier is associated with a first biometric identity.

9. The movement track generation method according to claim 1,
wherein the time information corresponding to the location information comprises a duration in which the first device is located in the WLAN coverage of the first home device and a duration in which the first device is located in the WLAN coverage of the second home device.

10. The movement track generation method according to claim 9, wherein the movement track generation method further comprises:

sending, by the server, a third message to an electronic device implementing a first application corresponding to the server, wherein the third message comprises at least one of the location information, the movement track, or the heatmap of the first device.

11. The movement track generation method according to claim 10, wherein the movement track generation method further comprises:

performing, by the server, scenario linkage control or alarm based on the at least one of the location information, the movement track, or the heatmap of the first device.

12. The movement track generation method according to claim 11, wherein the performing, by the server, scenario linkage control based on the at least one of the location information, the movement track, or the heatmap of the first device comprises:

determining, by the server, whether a scenario linkage trigger condition is satisfied, and in response to determining that the scenario linkage trigger condition is satisfied, controlling a target device to perform a target event, wherein:

the scenario linkage trigger condition comprises N attributes, and the N attributes comprise at least one of a biometric attribute, a range attribute, or a time attribute associated with the range attribute, wherein N is an integer greater than or equal to 1.

13. A movement track generation method, comprising:

sending, by a home device, a target frame on a target channel by using a first antenna, wherein the target frame carries service information published by the home device, the home device comprises the first antenna and a second antenna, and a wireless local area network (WLAN) coverage of the home device when using the first antenna is less than a WLAN coverage of the home device when using the second antenna;

after receiving a message from a first device in response to the target frame, determining, by the home device, that the first device enters the WLAN coverage of the home device when using the first antenna;

recording, by the home device, an entry event of the first device; and sending, by the home device, a first message to a server, wherein the first message indicates that the first device enters the WLAN coverage of the home device when using the first antenna, and wherein the first message is sent by the home device based on a preset time interval within which the first device enters or leaves the WLAN coverage of the home device.

14. The movement track generation method according to claim 13, wherein the movement track generation method further comprises:

when determining that the first device disconnects a WLAN connection between the first device and the home device, determining, by the home device, that the first device leaves the WLAN coverage of the home device when using the first antenna;

recording, by the home device, a leaving event of the first device; and sending, by the home device, a second message to the server, wherein the second message indicates that the first device leaves the WLAN coverage of the home device when using the first antenna.

15. The movement track generation method according to claim 13, wherein the WLAN coverage of the home device when using the first antenna is 0.1 m to 2 m.

16. A server, comprising:

at least one processor; and one or more memories coupled to the at least one processor and storing programming instructions for execution by the at least one processor to perform operations comprising:

determining a wireless local area network (WLAN) coverage of a first home device and a WLAN coverage of a second home device based on a floor plan, location coordinates of the first home device, and location coordinates of the second home device;

receiving a first message sent by the first home device, wherein the first message indicates that a first device enters or leaves the WLAN coverage of the first home device;

receiving a second message sent by the second home device, wherein the second message indicates that the first device enters or leaves the WLAN coverage of the second home device;

generating a movement track of the first device based on the first message and the second message, wherein the movement track of the first device comprises the location coordinates of the first home device and the location coordinates of the second home device; and determining a heatmap based on location information of the first device and time information corresponding to the location information, wherein the location information of the first device comprises the WLAN coverage of the first home device and the WLAN coverage of the second home device.

17. The server according to claim 16, wherein:

the first device is located in the WLAN coverage of the first home device in a first time period;

the first device is located in the WLAN coverage of the second home device in a second time period; and the first time period and the second time period have an overlapping period, the first device is located in an overlapping region of the WLAN coverage of the first home device and the WLAN coverage of the second home device during the overlapping period, and the movement track of the first device comprises location coordinates of a center of the overlapping region.

18. The server according to claim 16, wherein the first home device comprises a first antenna and a second antenna, and a WLAN coverage of the first home device when using the first antenna is less than a WLAN coverage of the first home device when using the second antenna; and the second home device comprises a third antenna and a fourth antenna, and a WLAN coverage of the second home device when using the third antenna is less than a WLAN coverage of the second home device when using the fourth antenna.

19. The server according to claim 18, wherein the WLAN coverage of the first home device when using the first antenna is 0.1 m to 2 m; or the WLAN coverage of the second home device when using the third antenna is 0.1 m to 2 m.

20. The server according to claim 16, wherein the time information corresponding to the location information comprises a duration in which the first device is located in the WLAN coverage of the first home device and a duration in which the first device is located in the WLAN coverage of the second home device.

\* \* \* \* \*